(12) United States Patent
Rush et al.

(10) Patent No.: US 11,977,587 B2
(45) Date of Patent: May 7, 2024

(54) SYSTEM AND METHOD FOR ACQUIRING A MEASURE OF POPULAR BY AGGREGATION, ORGANIZATION, BRANDING, STAKE AND MINING OF IMAGE, VIDEO AND DIGITAL RIGHTS

(71) Applicant: POPOLOGY MEGAVERSE LLC, Philadelphia, PA (US)

(72) Inventors: Daniel D Rush, Philadelphia, PA (US); Joe Rey, Collingswood, NJ (US)

(73) Assignee: POPOLOGY MEGAVERSE, LLC., Philadelphia, PA (US)

( * ) Notice: Subject to any disclaimer, the term of this patent is extended or adjusted under 35 U.S.C. 154(b) by 0 days.

(21) Appl. No.: 17/848,011

(22) Filed: Jun. 23, 2022

(65) Prior Publication Data

US 2023/0418885 A1  Dec. 28, 2023

(51) Int. Cl.
*G06F 16/00* (2019.01)
*G06F 16/41* (2019.01)
*G06F 16/432* (2019.01)
*G06F 16/951* (2019.01)

(52) U.S. Cl.
CPC ............ *G06F 16/951* (2019.01); *G06F 16/41* (2019.01); *G06F 16/432* (2019.01)

(58) Field of Classification Search
CPC ....... G06F 16/951; G06F 16/41; G06F 16/432
USPC ................................................ 707/600–899
See application file for complete search history.

(56) References Cited

U.S. PATENT DOCUMENTS

| 8,396,777 B1* | 3/2013 | Fine ...................... G06Q 10/04 |
| | | 705/36 R |
| 8,583,683 B2 | 11/2013 | Rathod | |
| 10,277,946 B2 | 4/2019 | Chang | |
| 10,839,466 B2 | 11/2020 | Doyle | |
| 11,636,520 B1* | 4/2023 | Olden ............... G06Q 30/0277 |
| | | 705/14.69 |
| 2006/0101037 A1* | 5/2006 | Brill .................... G06F 16/9574 |
| 2009/0064029 A1* | 3/2009 | Corkran ................ G06F 3/0482 |
| | | 707/999.005 |
| 2013/0073387 A1* | 3/2013 | Heath .................... G06Q 30/02 |
| | | 705/14.53 |
| 2016/0012465 A1* | 1/2016 | Sharp ................... G06Q 20/321 |
| | | 705/14.17 |
| 2016/0094646 A1 | 3/2016 | Spivack | |

(Continued)

*Primary Examiner* — Irete F Ehichioya
*Assistant Examiner* — Shirley D Hicks
(74) *Attorney, Agent, or Firm* — The Law Offices of Louis M. Heidelberger, Esq.

(57) ABSTRACT

Systems and immersive methods for constructing a personalized and user-assembled meta search engine are provided for aggregation and organization of image, video and digital rights data that allow a user to curate a broadcast of selected tiles that can be published and legered into a blockchain. The meta-search engine combines multiple API components to operate collectively as the initial search algorithm. The system and method include a data collection element, a brand commercial placement for sponsorship element, a stake and mining rewards against placed media element and a user interface that allows publishing of a unique curated media stream as a first-time-ever non-fungible token (NFT) broadcast. Also included are artificial intelligence, virtual reality, connected alternative metaverses and an assembly of broadcasts into video on demand channels.

29 Claims, 29 Drawing Sheets

(56) References Cited

U.S. PATENT DOCUMENTS

| | | |
|---|---|---|
| 2016/0261669 A1 | 9/2016 | Elliot |
| 2017/0116693 A1 | 4/2017 | Rae |
| 2017/0169800 A1* | 6/2017 | Greco ................ H04L 67/5681 |
| 2017/0221029 A1 | 8/2017 | Lund |
| 2019/0155997 A1 | 5/2019 | Vos |
| 2020/0090143 A1 | 3/2020 | Iervolino |

* cited by examiner

SYSTEM AND METHOD FOR ACQUIRING A MEASURE OF POPULAR BY AGGREGATION, ORGANIZATION, BRANDING, STAKE AND MINING OF IMAGE, VIDEO AND DIGITAL RIGHTS

FIELD OF THE INVENTION

The present invention generally relates to the organization and aggregation of image, video and digital rights data and assets acquired from a plurality of sources that may include a sponsorship or brand element and may also include a stake and/or mining rewards for a user in merchandising its unique data stream. These digital rights may be blockchain ledgered for appropriate reimbursement as non-fungible tokens ("NFTs") in recognition of fair use reporting.

BACKGROUND

The current internet paradigm, termed Web 2.0, is defined by the prevalence of user-generated content and enhanced end-user interactivity aggregated onto Internet platforms. Accessibility of content is mediated by search engines and software systems managing the process of locating content on the basis of proprietary indexing algorithms. Single users generally maintain the usage of a single preferred search engine despite their expansion in count, including Google, Yahoo, Yandex, Bing or DuckDuckGo. Differences in algorithms lead to distinctions in content discovery, which may impose the use of several alternative search operations or the use of a meta-search engines capable of aggregating multiple sets of results into a singular curated set. Meta-engines tend to differ in terms of breadth of search-engine integrations, with limitations being specific to the chosen meta-search provider: DogPile.com combines results from Google, Yahoo, Ask and Live; Surfwax gathers results from Ask.com, About.com, Entireweb, Business.com, Gigablast, Wisenut, ODP; while Clusty may access Ask.com, Gigablast, Live, NY Times, ODP, Shopzilla and Yahoo. Thus, the limiting factor arises from the implication that vetting headlines impose an additional time commitment.

An additional layer of risk is imposed by the novel patterns of data gathering from the platforms. The increasing user sensitivity to the phenomenon, combined with slow uptake or extension of legal solutions such as General Data Protection Regulation (GDPR), Personal Data Protection Law (PDPL), or various sets of local laws and regulations such as California's Consumer Privacy Act (CCPA), renders lack of privacy to be an increasingly pivotal determinant of user behavior online especially given the psychological sense of inequity imposed by the profits accrued from the use of the data without tangible rewards given back to the user.

Excessive usage of brand marketing and advertisement tailored on the basis of specialized algorithms able to sift and interpret the data collected from users had been perceived and reported to be generators of distress, discomfort, and forced repetitive cycles as seen in the example of skipping advertisements before a YouTube Video or closing a pop-up banner which loads before an article. Brand retention and relevance in a manner supportive of audience interests is progressively diminished by the user experience.

User Loyalty to a single leading brand search engine may be regarded as a self-imposed limitation to content prioritized by the given algorithms, as a direct implication of their specific set of peculiarities, business interests or internal design priorities and decisions. Considering the extensive yet constantly expanding range of media content created and distributed online, novel manipulation strategies including misinformation campaigns, which have been posing increasingly augmented security risks, as a direct results of the increased comprehension of the vulnerabilities of search algorithms and the mechanics through which they can be abused for propagating messages that appeal to the beliefs and propensities of unaware users. Aggregation of data from multiple sources provides an inherent defense mechanism against this concern, given how unrelated search engines do not experience the same vulnerabilities and are thus able to cancel out malignant or manipulated streams of information.

POPOLOGY facilitates an exclusive user experience built upon custom/self-reported preferences of their preferred social (SM), search (SE) and video on demand (VOD) subscription services. These services usually predicate invasive algorithms to user behaviors (online activities) and tracking for internal data use. POPOLOGY sources these aggregated algorithms into refocused efficiency to the users, designed to enhance the functionality of a customized meta-search engine with the addition of a reward mechanism through which aggregated behaviors (online activities) and preferences can be value-locked via megabyte tracking on the blockchain, essentially monetizing and rewarding a user's data in a democratized manner through the issuance of the POPtoken.

The POPOLOGY concept solves the current lack of rewards for content curation due to the dependence of web 2.0 platforms (e.g., Facebook, Instagram, Reddit, Twitter, etc.) on the value curators add in the form of exposure, promotion and viral adoption for the platform's own success, as the value addition is always complementary and potentially higher than the value generated by content creators themselves. Curation is the generalized and primary commodity of online journalizing, posting and reporting. POPOLOGY supports all platforms and enhances the user experience by strengthening curation, and applying a non-competitive, yet still disruptive edge to hub the internet for ease in digital rights tracking. Through the use of Blockchain, digital rights can be preserved and efficiently tracked and considered, thus recovering losses resulting from Digital Rights Piracy. The method involves the use of a private key pair that is platform-specific, with content decryption from digital media work being mediated by the decrypted content key in addition to the curator's requesting fulfillment per the data entry requirements. When content is ledgered on the blockchain these encrypted private keys pair with rewards payments, and reports to copyright holders of content use. Providing an automated backend process for producing Fair Use Reporting, with a calculated crypto rewards payout to all players and fulfilment of copyright owners' digital reports records.

SUMMARY OF THE INVENTION

Systems and immersive methods are provided for aggregation and organization of image, video and digital rights data. In an exemplary embodiment, a system for aggregation and organization of media data acquired from a plurality of sources is provided. The system includes a data collection element, a brand commercial (POPmercial) placement for sponsorship element, a stake and mining rewards (Futures In Popular) against placed media element, and a user interface that allows publishing of a unique curated media stream as a first-time-ever NFT BROADCAST, (POPcast). The development environment is built on UNITY GAME ENGINE/ WebGL, .Net Core supporting API calls populating into the immersive 360 degree workspace, TFS/SVN (Team foundation server/Subversion (version) control system). TFS is an Application Life-cycle Management solution. SVN is source control only. TFS does source control as well as issue tracking, document management, reporting, continuous integration, virtual labs for testing etc.) and Visual Studio 2019, with a staging environment on AWS Server, and Waves Exchange blockchain/crypto service. The data collection element can be configured to receive rewards for the user in merchandising their online (cross platform) behaviors as well. In this behavior, 'digital rights' are appropriately blockchain ledgered for applicable reimbursements and recognition in fair use reporting.

A system for transmission, reception, and accumulation (aggregation) of API key codes is provided to a plurality of image and video content on the internet servicing a media operating system and decentralized digital rights platform invoking fair use reporting and summary reports on metrics of "popular at large". Defining true popular in the culture of societies driving from unbranded sources. The POPOLOGY POPsphere Aggregator redefines the pinpointing for the intensity of SERPs (aka search engine results pages). These SERPs each source different algorithm controls for the ordering and presentation of content, so users see what is most relevant to the platform. These are the pages that Google and other search engines display when you seek information including Content Newsfeeds (aka RSS). This is concise tidbits of content that are distributed on a regular basis that may include hashtags. Started on Twitter, these are keywords that enable readers to search for information on social media using the same word. POPOLOGY combines these customized corporate algorithms to convert their prowess's to a bundled content pipeline that empowers users as commercial grade broadcasters for more robust popularity metrics and data reports.

In one embodiment the following steps are processed: Identify—Often done entirely by machines, the content is discovered from a variety of established sources based, generally in the form of one or more keywords or phrases. As a result, there's a limited need for human interaction; Select—Choosing the best of the information discovered while eliminating low-quality information and promotions and filters out information that's missing proper attribution or links. This work can be automated; Classify—Place the information into a pre-establish organization such as a list of categories or another method of grouping content; Arrange—Systematically ordering results in an easy-to-understand manner withoutany tailoring based on product, company, or brand and without additional commentary. Common Arrangements are by publication date or alphabetically by author; Publish—Place the aggregated information on your own or another organization's platforms. Additional commentary or annotation isn't needed. It may include some original text or a link or citation to the original source and may also distinguish between the third party and original content.

The User Interface Section embodiment has a 360 degree immersive workspace with over 2400 tiles to view with an x, y, z axis navigation. Populating from one keyword search and masking over 10 aggregated platform APIs into its spherical domain.

The intervention Section embodiment allows search result tiles to be dragged and dropped to the POPcast timeline and ledgers onto the POPblock (blockchain). Each tile placement is rewarded one POPtoken and may be tracked on a smart contract as well. In another embodiment there may be a console inside the POPsphere that may access all dashboards, prompt media viewing, and may serve as a conference monitor while building a POPcast.

The Response Section embodiment may permit tapping on the tiles to view them on the player, drag and drop them into the POPcast Timeline, and/or stake a POPtoken wager for mining additional POPtoken rewards for correctly forecasting increase of the selected media views to the transaction ledger on the blockchain. Users may be able to create, interact, publish, share and add the security of their content with the POPsphere.

Disruptive Characteristics include: (1). Customizable aggregation of search engine results through permitting users to select or create their preferred search algorithm. Potential arises for curating one's own multimedia content based on each individual's specific selected interests, creating a unique experience of content discovery and consumption through the special design of the Application Environment/UI/UX, consisting of a 360° scrollable spherical area lined with 2400 rectangular content windows gathering results from 3 to 25 user selected platforms such as Facebook, Instagram, Daily Motion, Youtube, Tic Tok, and Google etc, named and/or color coded on the POPsphere. The size of the content roster presented at-a-glance permits cross-checking of contrasting content, encouraging objective assessments, and diminishing efficiency of misinformation campaigns, as well as entirely eliminating the echo-chamber effect. (2). A user-oriented income generation mechanism is developed by the introduction within POPcast of a section of the application where users can watch and place commercials (POPmercial) at will in the interest of being paid a portion of the cost of advertising in the form of POPtoken. This introduces extensive gamification, customizable data retention and processing that targets commercials based on user-defined interests for brands where interest is already present, in addition to the seamless integration within the consumed curated content collection; and 3. The Stake and "Green Mining" premise introduces additional rewards through collection of data on the subject of "true popular" metrics. This enables a unique implementation of proof-of-work (a form of cryptographic proof in which one party proves to others that a certain amount of a specific computational effort has been expended), and a novel mechanic for mining in app tokens whilst assuring value creation through user-provided weightings. A wagering mechanism is introduced to expand the active earning potential on the basis of predicting future video views on a user-defined time frame and with a user-selecting staking amount. An essential target achieved by the aforementioned mechanics assures a green implementation, devoid of large computational need or energy consumption. The uniquely accessible value of the VIEWS counter participates in the crypto-graphical block generation through as a unique seed contributing as a nonce to the algorithm for consensus generation.

In one embodiment the user may select various search engines, which may include combined search engines, metadata and social media. The selection may be from cites the user regularly uses so the algorithms for these sites may conform to the users preferences and behaviors developed from the users past searches. A result of such uses the user employs unique algorithms based upon the user's selections, further in view of the past user searches. The user may use the results of such selections to develop a POPcast, or stream of content to fabricate a concept, story, description, and/or trailer that conveys a particular aggregation of content.

In another embodiment, the user may select various brands and commercials to use in and insert as the user deems appropriate into the POPcast. These brands and/or commercials may be ledgered such that the brand owners are compensated by individuals that view the brands and/or commercials including in the form of POPtoken. The combination of the POPcast with the brands and/or commercials creates a seamless integration of curated content that can be monetized.

In yet another embodiment a POPcast may be monetized in the form of wagering POPtokens for the number of views a given POPcast will receive within a specified timespan. As the wagering becomes more aggressive in the form of amount and timespan to achieve a viewership result, the POPOLOGY algorithms may suitably reward the wagerer in view of the circumstances, namely, the more aggressive the wager the higher the reward. The uniquely accessible value of the VIEWS counter participates in the crypto-graphical block generation through as a unique seed contributing as a nonce to the algorithm for consensus generation.

Figure 1:
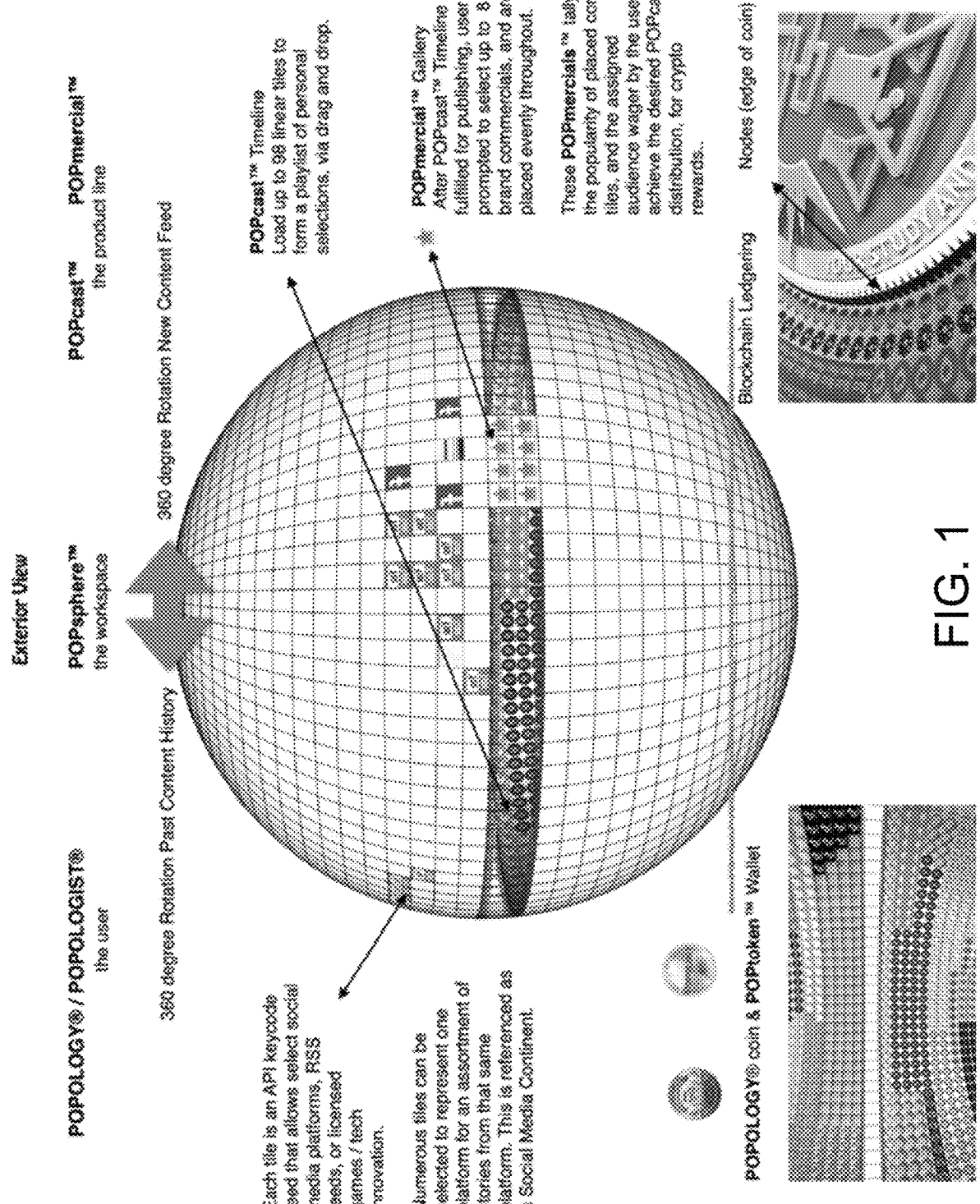
FIG. 1 illustrates some components of the POPsphere in accordance with an embodiment of the present invention.
Figure 1A:
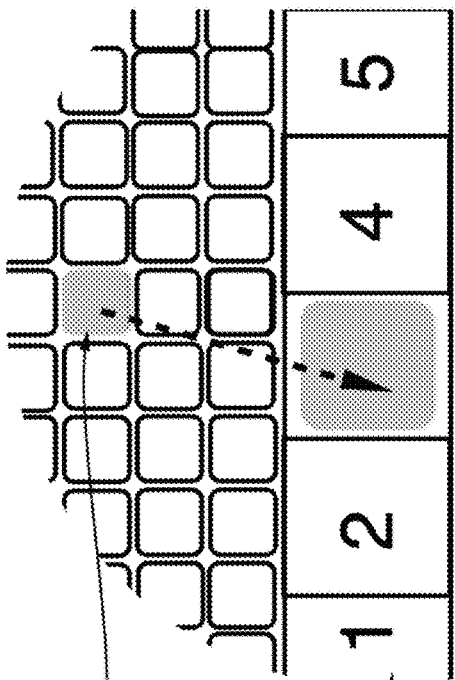
FIG. 1A illustrates a representative API tile in accordance with the present invention.
Figure 1B:
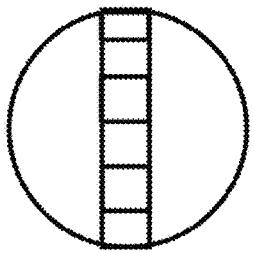
FIG. 1B illustrates a portion of a timeline of representative tiles in accordance with the present invention.
Figure 1C:
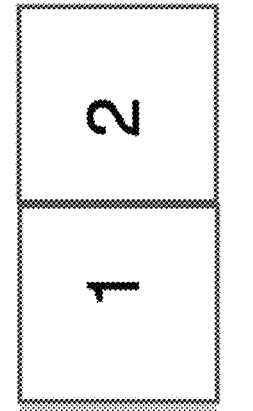
FIG. 1C is an exploded view of the portion of the timeline of FIG. 1B.
Figure 1D:
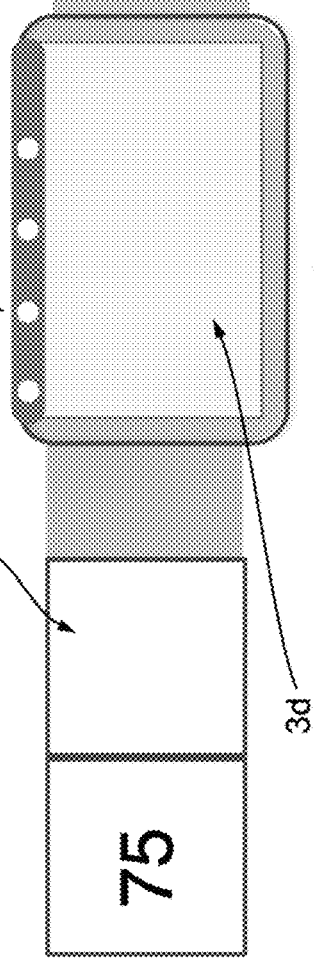
FIG. 1D illustrates a publishable NFT curation of cross platform video and image stories in accordance with the present invention.

3d illustrates in FIG. 1D a POPsphere Internal Console to access platform dashboards in accordance with the present invention.

3e illustrates the top buttons of the internal console of FIG. 1D in accordance with the present invention.

Figure 2:
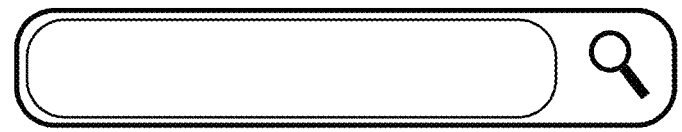

FIG. 2 illustrates a POP-up Search Bar Feature for cross platform keyword search, also Search Bar feature on POPsphere Console Appliance in accordance with an embodiment of the present invention.

Figure 3:
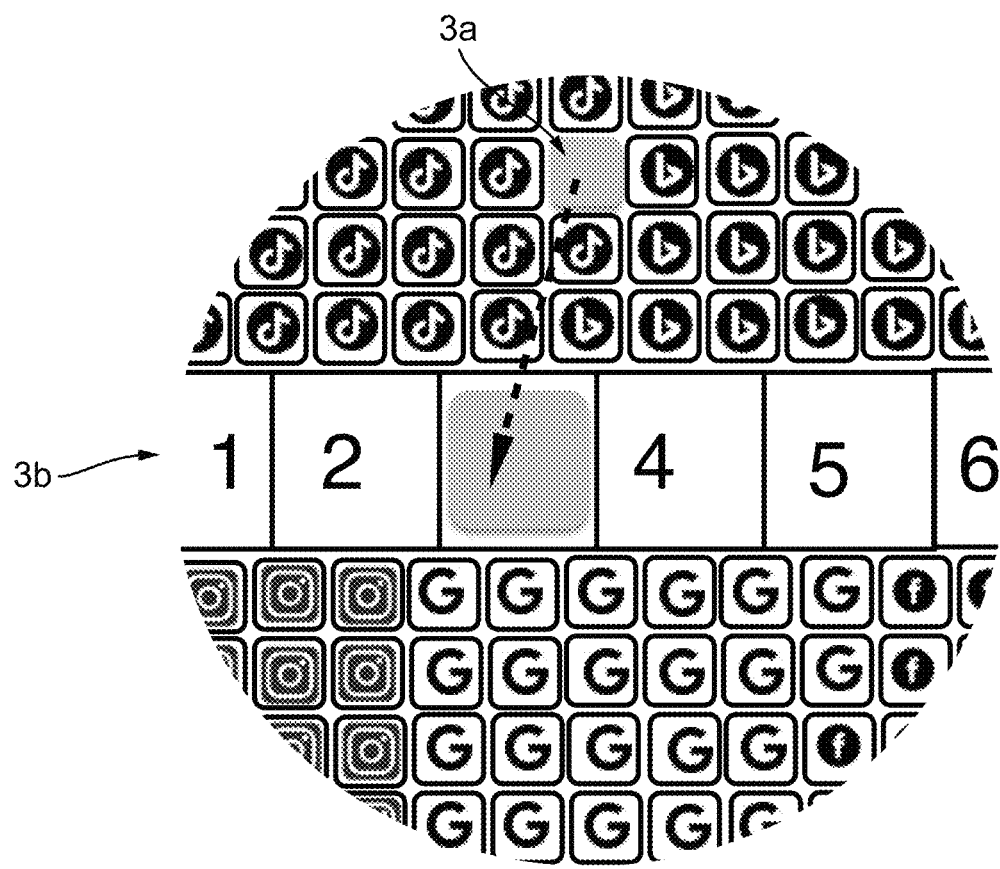
Figure 3:
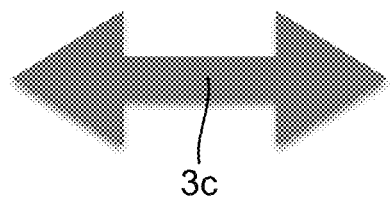

FIG. 3 illustrates an API tile of a portion of the POPshere depicting tiles from the same source in accordance with an embodiment of the present invention.

3a illustrates the drag and drop feature allowing a tile from 3a to be dropped into the timeline of 3b.

3c indicates a 360 degree POPsphere in accordance with the present invention.

Figure 4A:
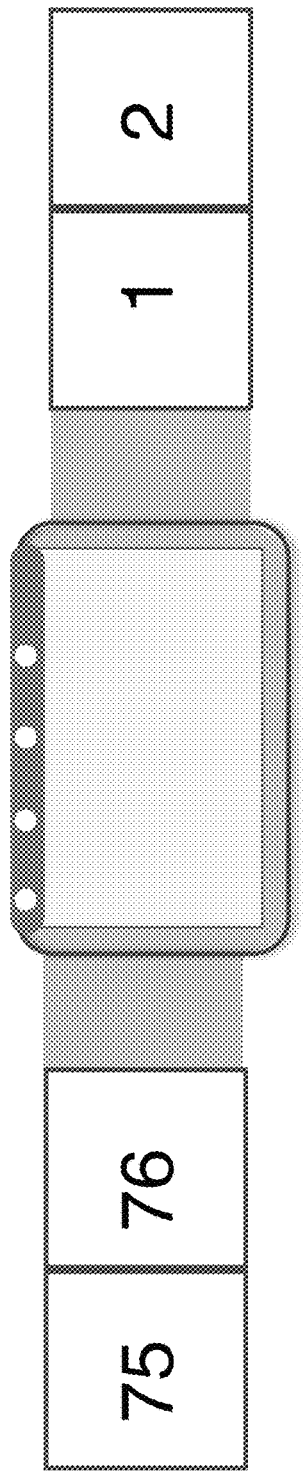
Figure 4B:
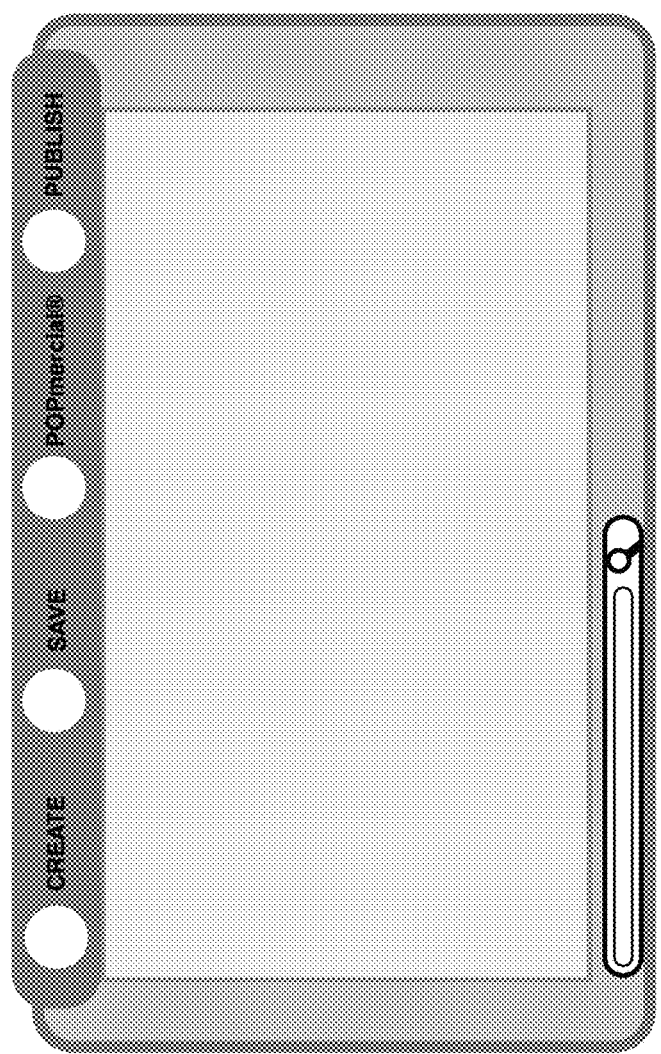

FIG. 4A illustrates an embodiment where there are 76 cross platform individual tiles in the POPcast timeline in accordance with the present invention. FIG. 4B details the internal POPcast Console for access to feature sets.

Figure 5:
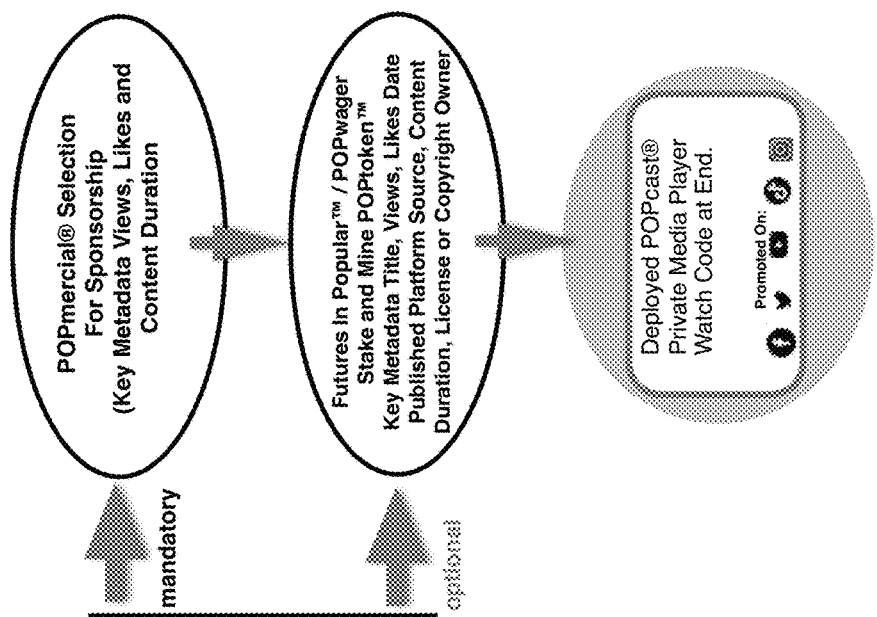
Figure 5:
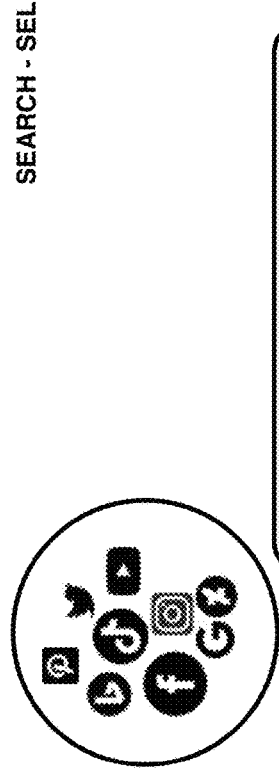
Figure 5:
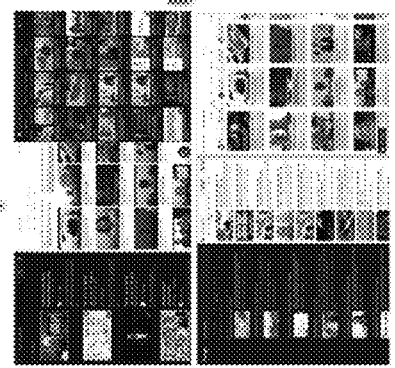

FIG. 5 is a flow diagram illustrating aggregation to POPcast Publish in accordance with the present invention.

Figure 6:
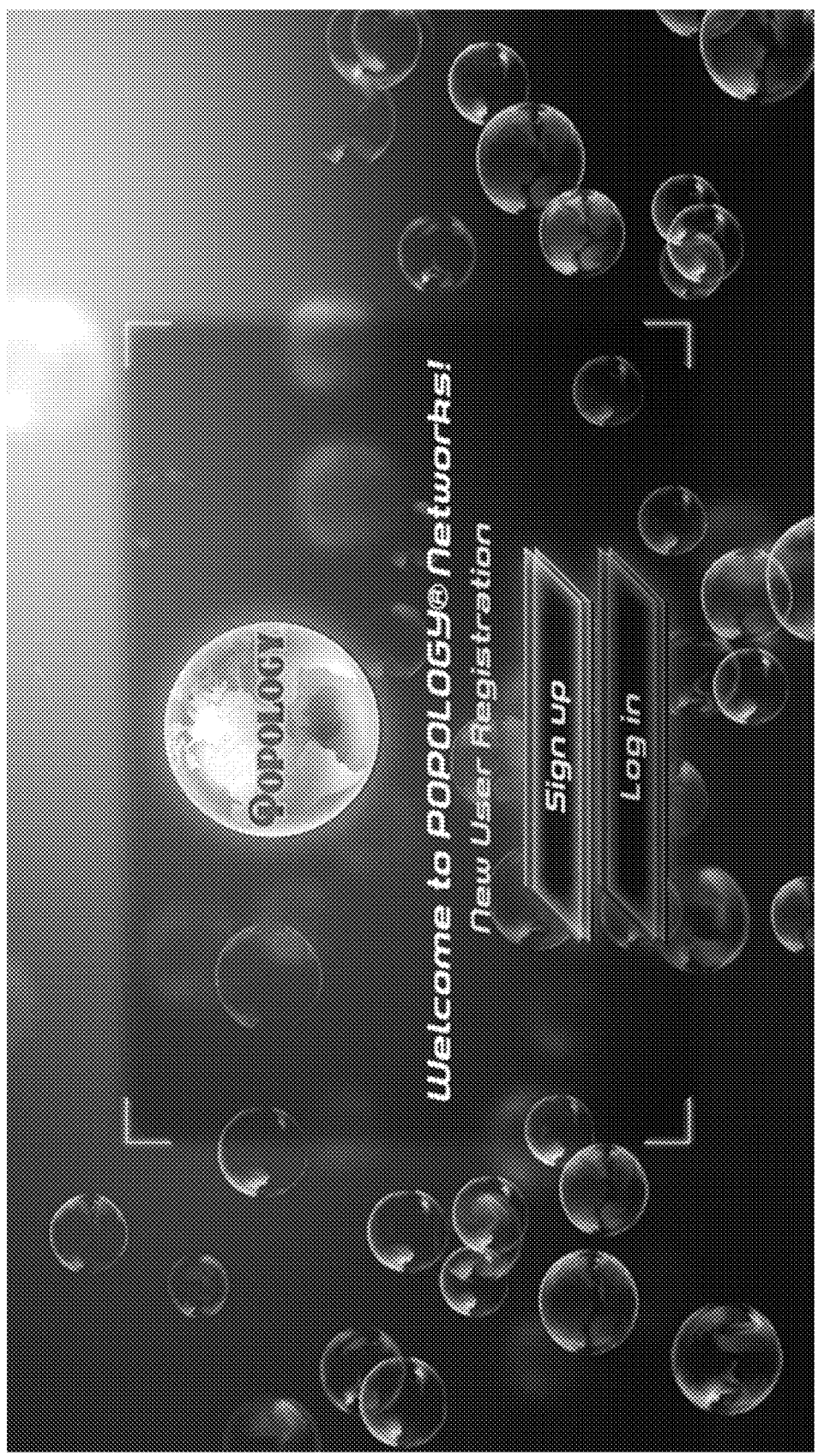

FIG. 6 Splash Screen Signup or Log In

Figure 7A:
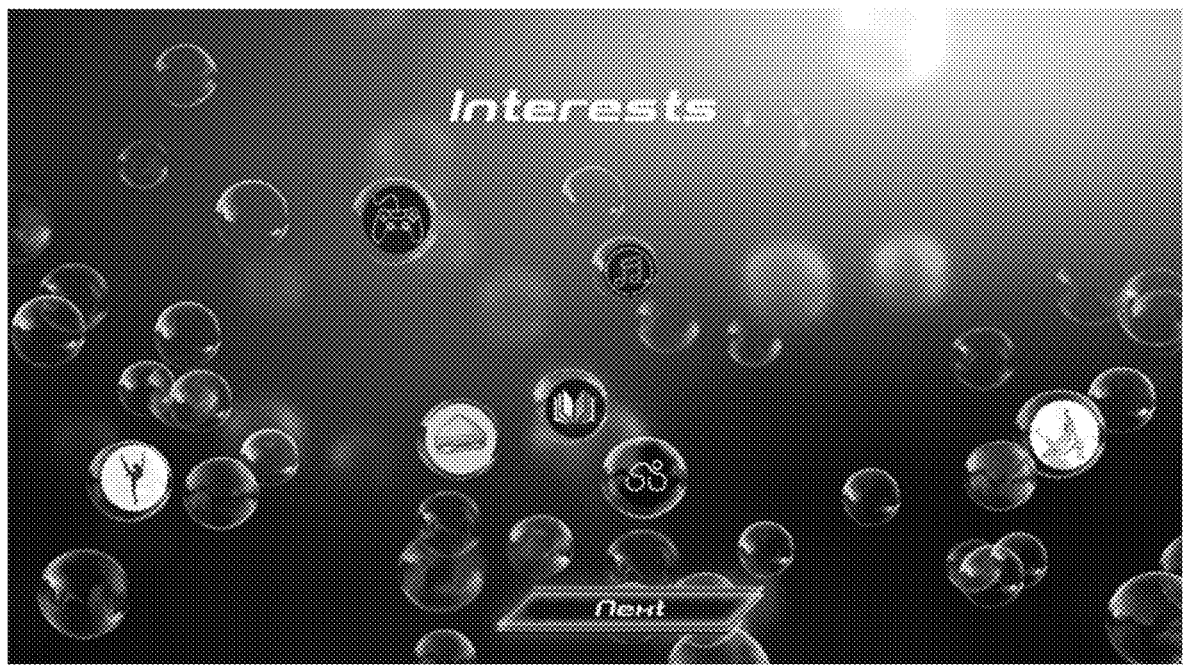
Figure 7B:
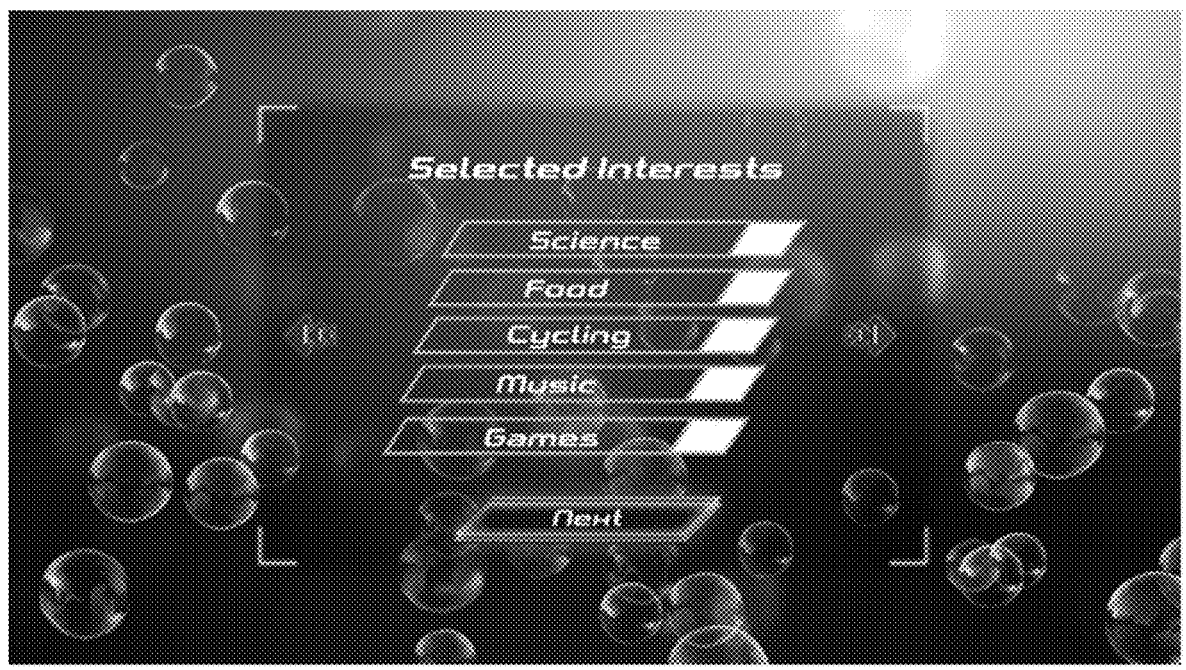

FIGS. 7A & 7B Splash Screen Select "Interests" from Icons w/ CONFIRM screen, A computer-implemented method comprising users interests in General Interests and associations by popping the moving logos incased in bubbles to aggregate into your POPOLOGIST profile Dashboard (FIG. 15) presenting a user interface to confirm selections made before moving on.

Figure 8A:
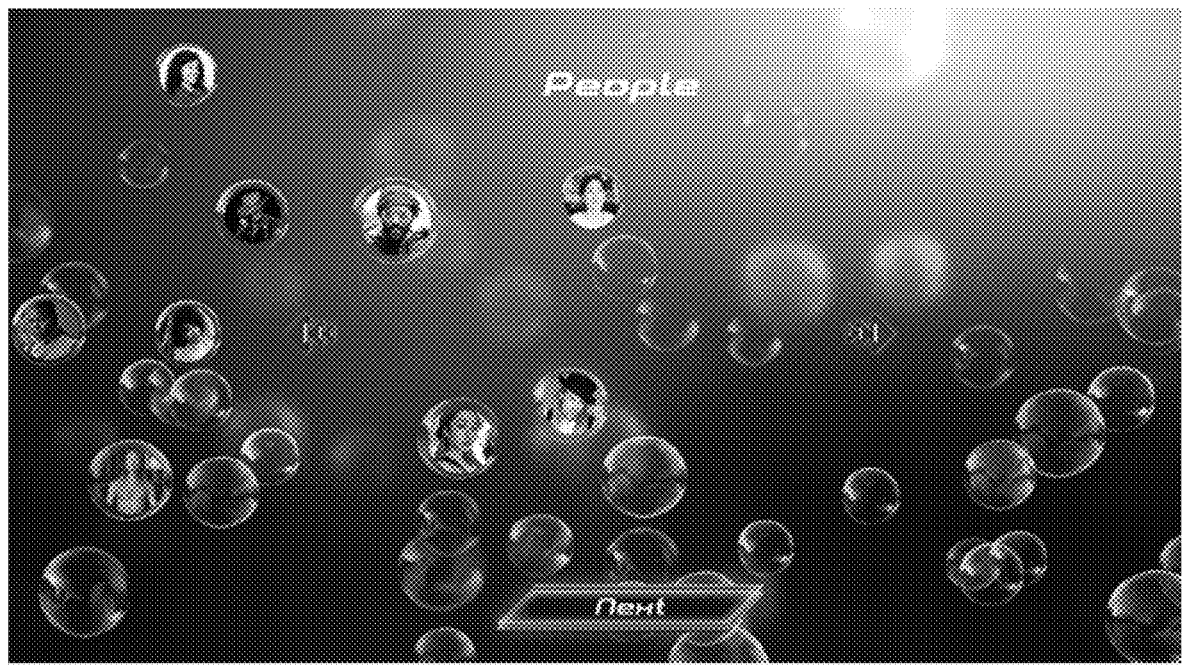
Figure 8B:

FIGS. 8A & 8B Splash Screen Select "People" from Icons w/ CONFIRM screen is illustrative of a computer-implemented method comprising users interests in Celebrity associations by popping the moving logos incased in bubbles to aggregate into your POPOLOGIST Dashboard (FIG. 15) presenting a user interface to confirm selections made before moving on.

Figure 9A:
Figure 9B:
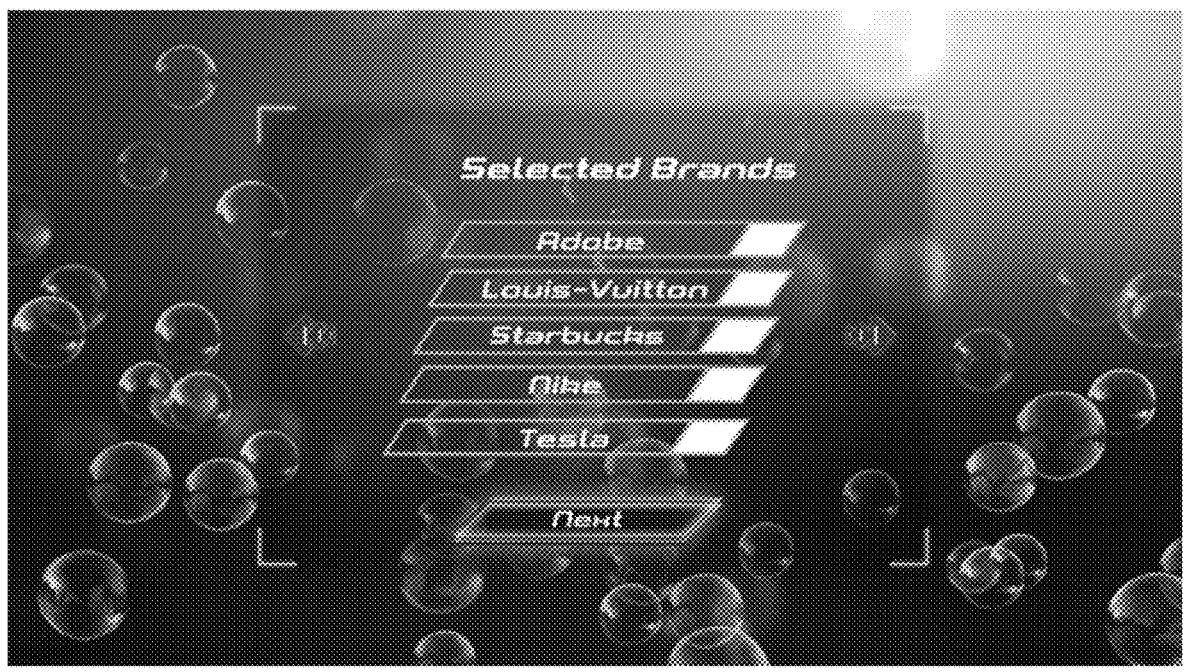

FIGS. 9A & 9B Splash Screen Select "Brands" from Logos w/ CONFIRM screen is illustrative of a computer-implemented method comprising users interests in BRAND LOYALTY associations by popping the moving logos incased in bubbles to aggregate into your POPmercial Gallery Dashboard (FIG. 27A) presenting a user interface to confirm selections made before moving on.

Figure 10A:
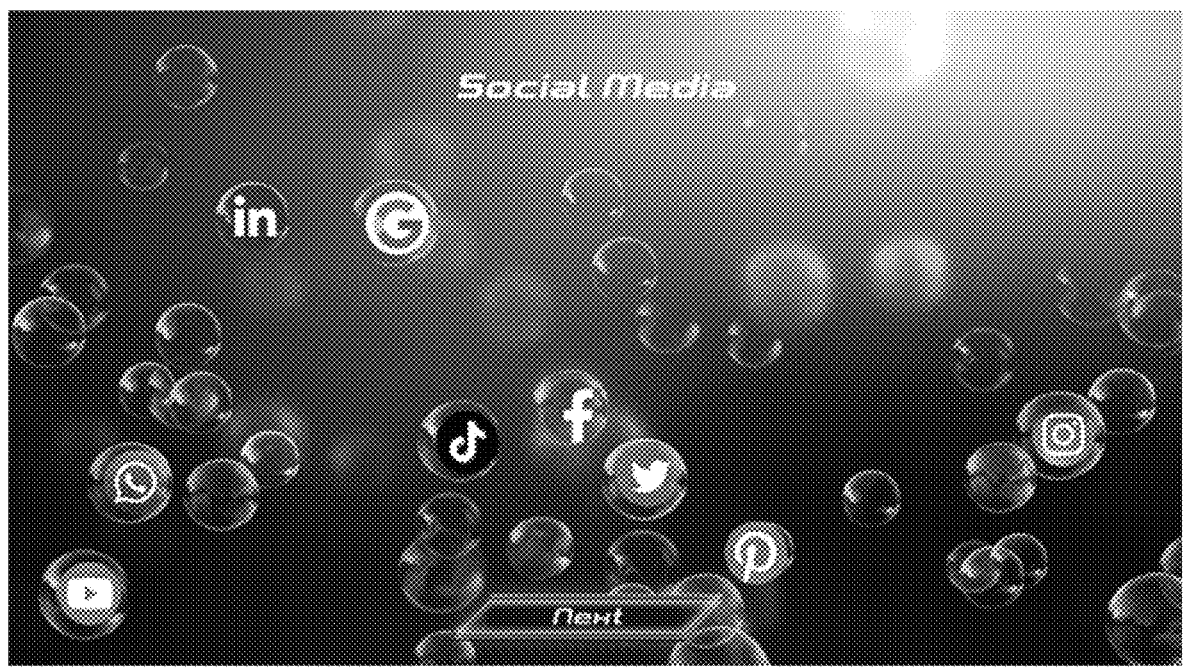
Figure 10B:

FIGS. 10A & 10B Splash Screen Select "Social Platforms" from Logos w/CONFIRM screen us illustrative of a computer-implemented method comprising users memberships to aggregate Social Media associations by popping the moving logos incased in bubbles to aggregate into your API LOAD Gallery Dashboard (FIG. 14D) presenting a user interface to confirm selections made before moving on.

Figure 11:
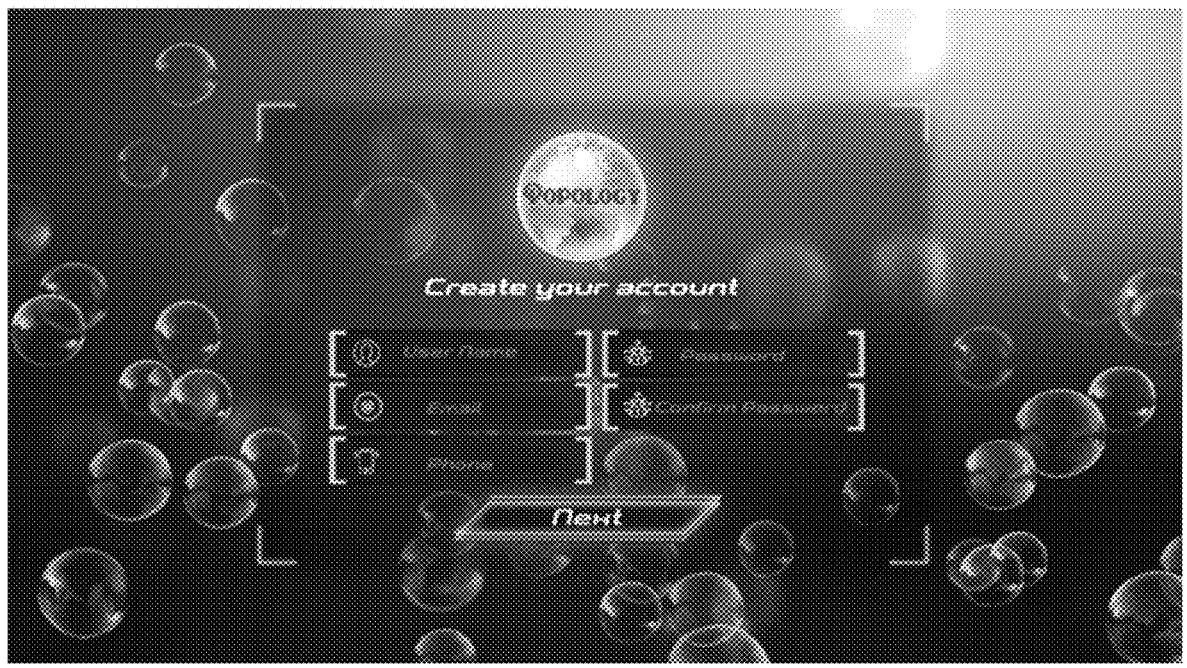

FIG. 11 Splash Screen illustrates USER INTAKE DATA/ Personal Info is illustrative of a computer-implemented method digesting personal user data, email, phone number, password, and username.

Figure 12:
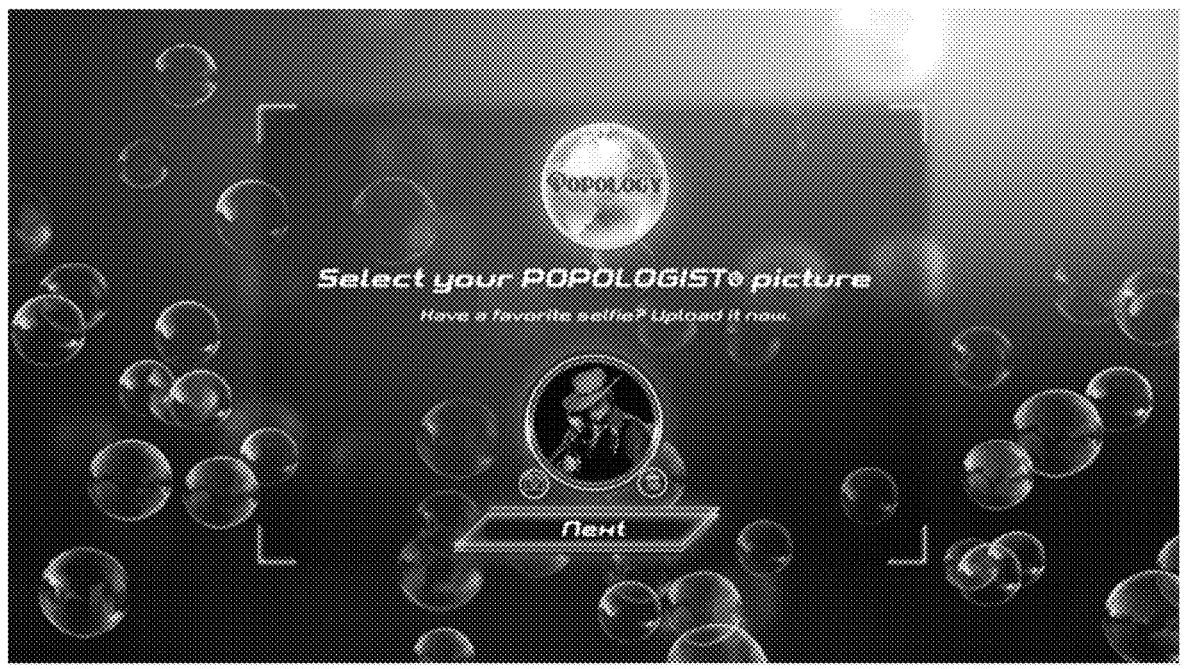

FIG. 12 Splash Screen Select Personal Profile Picture is illustrative of a computer-implemented method for uploading a selected profile jpeg or png for platform identification displays.

Figure 13:
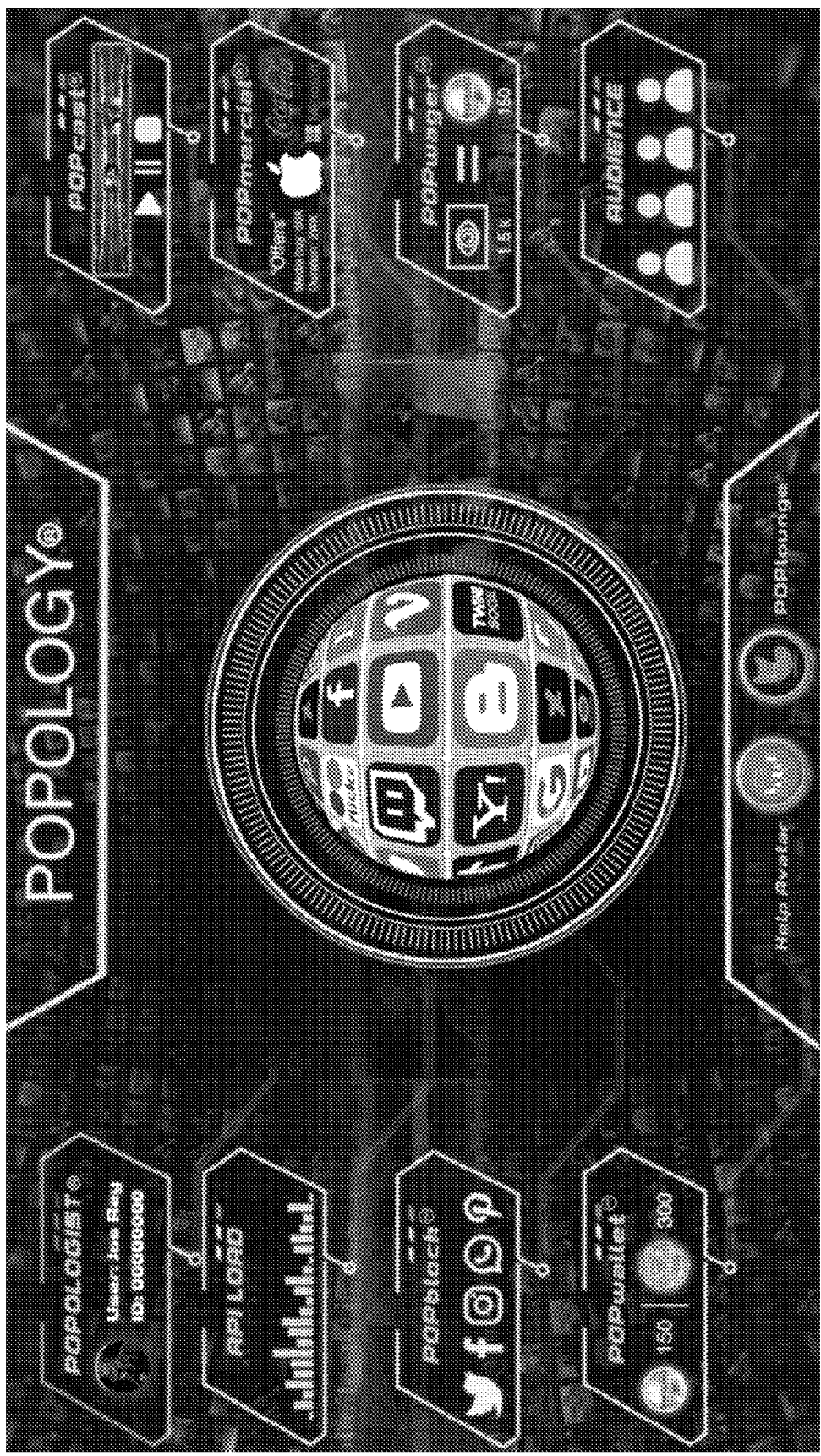

FIG. 13 is illustrative of a 5 second Intro Animation of Main User Dashboard that provides introduction of the main dashboard and all sub dashboards supporting all features and web-app modules.

Figure 14A:
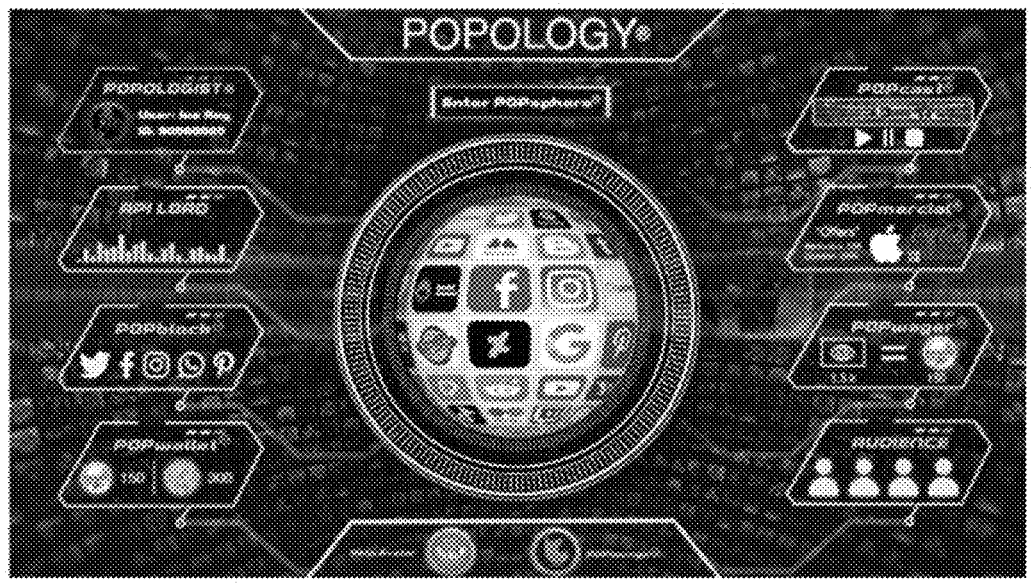

FIG. 14A illustrates an embodiment of a POPOLOGY dashboard in accordance with the present invention. FIG. 14C illustrates the selection of the number of tiles to populate a given API in the POPsphere.

Figure 14B:
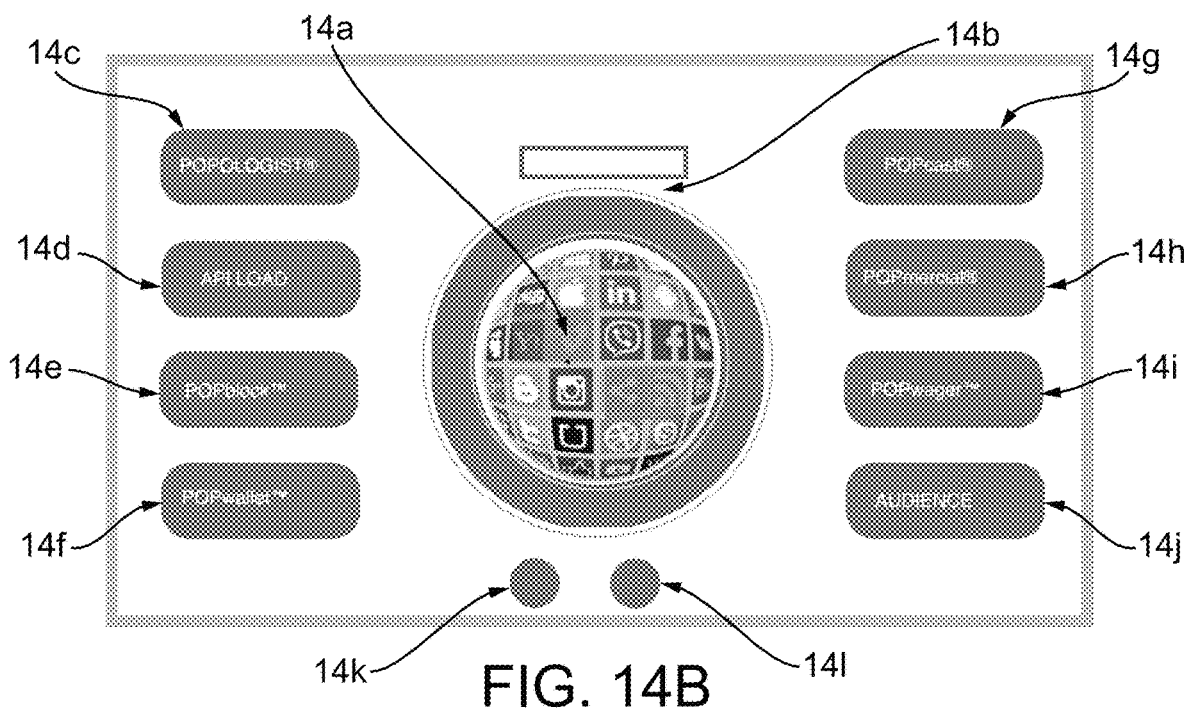
Figure 14C:
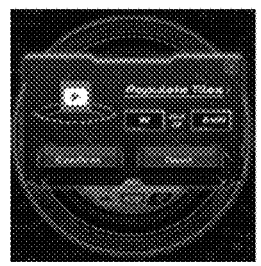

14a in FIG. 14B illustrates an embodiment feature to configure APIs to the 2400 tile POPsphere in accordance with the present invention.

14b illustrates an access button to enter a user interface for the POPshere in accordance with the present invention.

14c illustrates an access button to enter personal profile controls and NFT content mining in accordance with the present invention.

14d illustrates an access module to configure API details and settings in accordance with the present invention.

14e illustrates an access button to enter block chain functionalities of each API behavior and report elements in accordance with the present invention.

14f illustrates an access button to enter the digital wallet dashboard in accordance with the present invention.

14g illustrates an access button to enter POPcast project vault and POPlifter element in accordance with the present invention.

14h Illustrates an access button to enter POPmercial advertising placement dashboard in accordance with the present invention.

14i illustrates an access button to enter POPwager, a "Futures in Popular" as a stake and mine game dashboard in accordance with the present invention.

14j illustrates an access button to enter an audience dashboard in accordance with the present invention.

14k illustrates a help screen element in accordance with the present invention.

14l illustrates an access button to a POPlounge dashboard in accordance with the present invention.

Figure 15A:
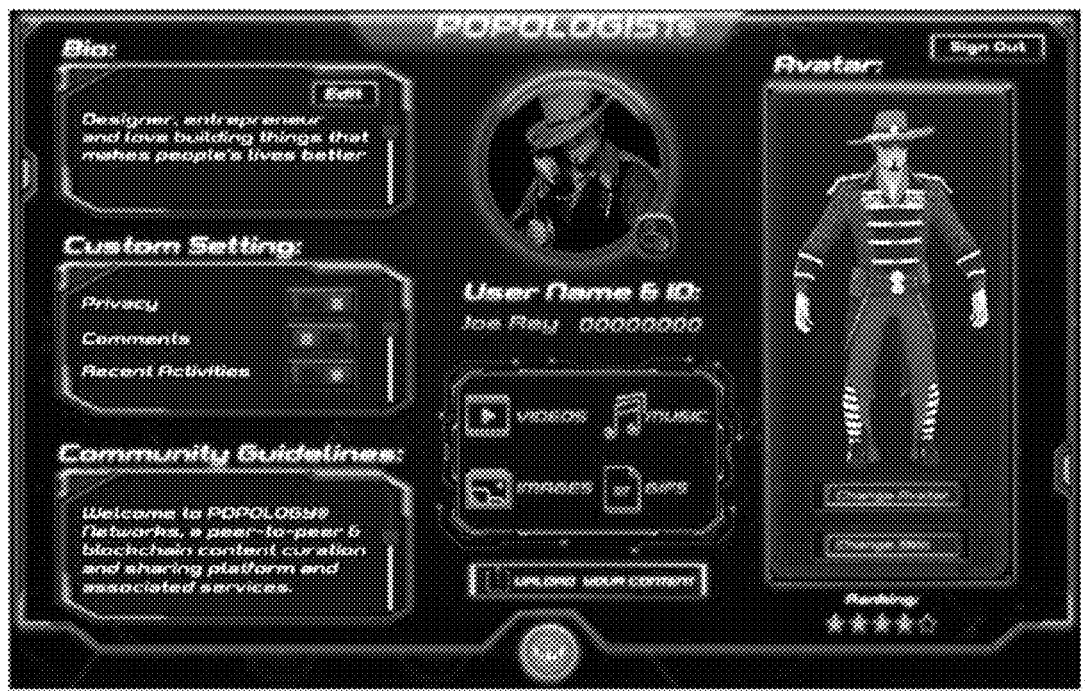

FIG. 15A illustrates a POPOLOGIST profile dashboard in accordance with the present invention.

Figure 15B:
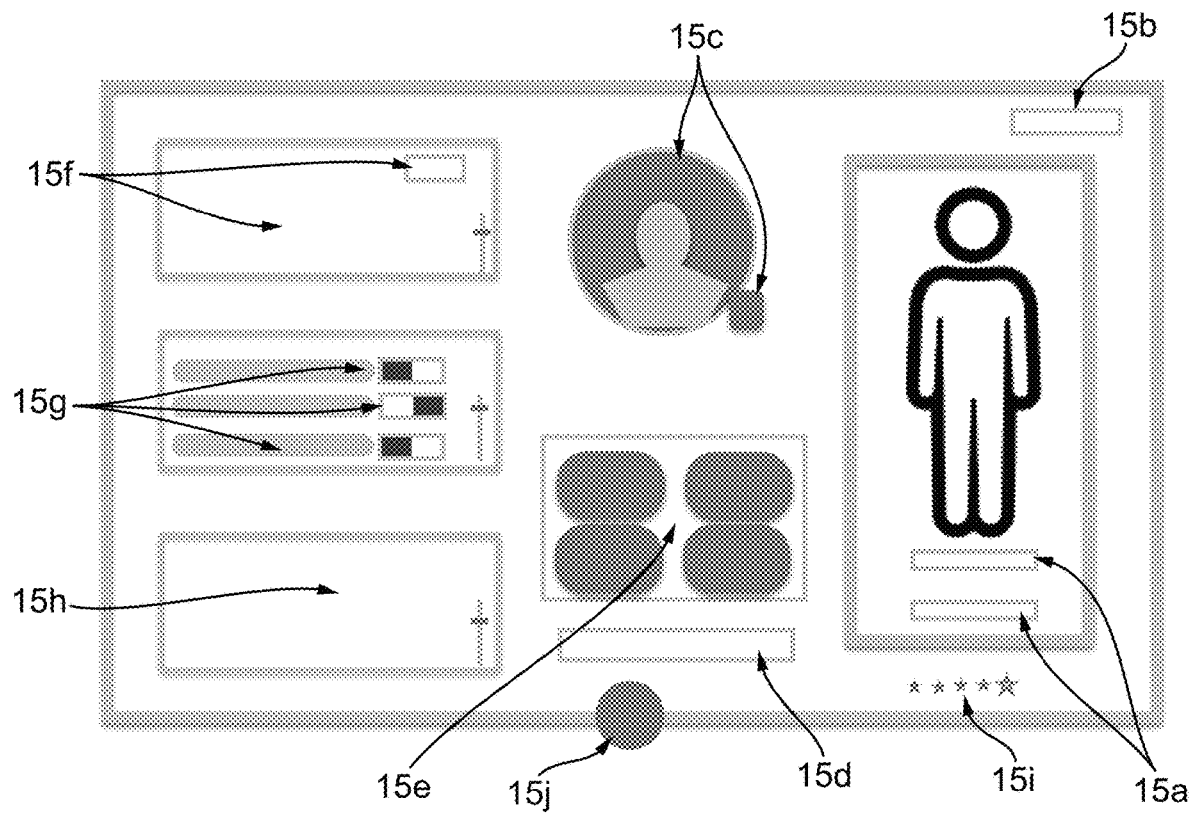

15a in FIG. 15B illustrates an avatar selection and modification module in accordance with the present invention.

15*b* represents a platform logout element in accordance with the present invention.

15*c* illustrates a profile picture and upload/change element in accordance with the present invention.

15*d* illustrates a personal content upload/change element in accordance with the present invention.

15*e* illustrates an NFT gallery viewer/configure screen in accordance with the present invention.

15*f* illustrates biography text entry/edit test modules in accordance with the present invention.

15*g* illustrates settings for custom, privacy and comments in accordance with the present invention.

15*h* illustrates community guidelines elements in accordance with the present invention.

15*i* illustrates star ranking platform stat display in accordance with the present invention.

15*j* illustrates access to help screen in accordance with the present invention.

Figure 16A:
Figure 16B:
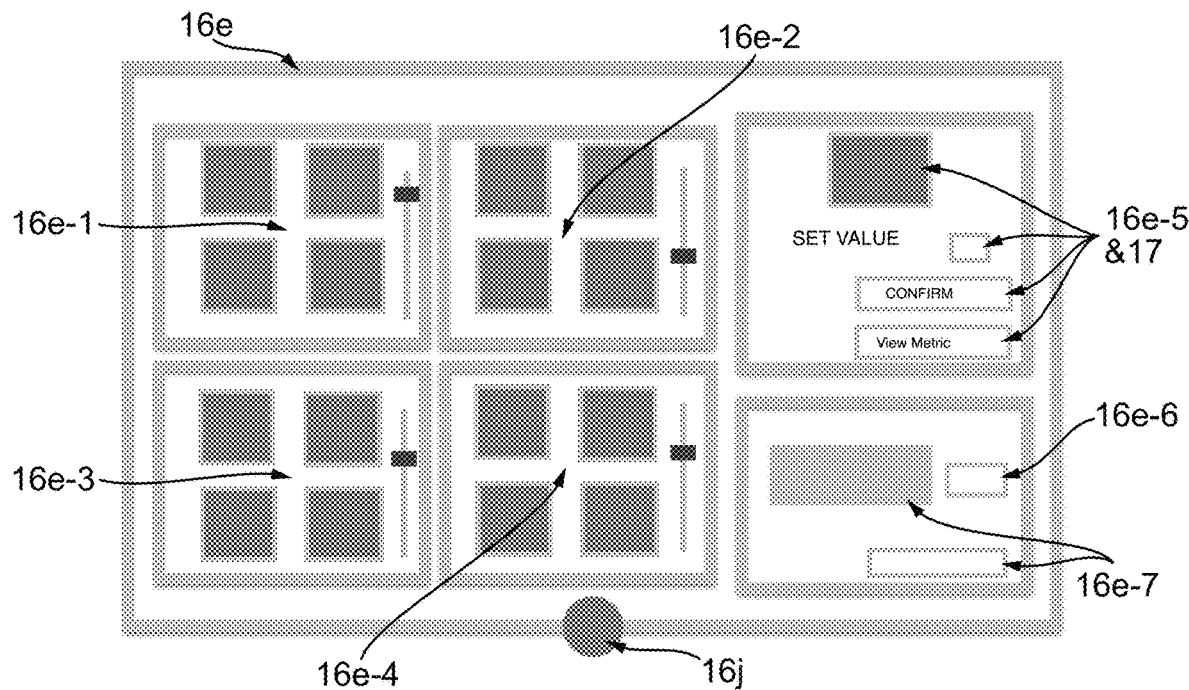
Figure 16C:
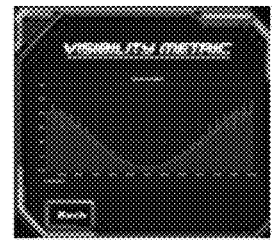

FIG. 16A & FIG. 16B together with 16*e* illustrate an upload gallery for various POPtoken techniques in accordance with the present invention. FIG. 16C illustrates the number of views a user's uploaded material receives when incorporated into another users POPcast.

16*e*-1 in FIG. 16B illustrates a display module for personally owned videos uploaded and legered on blockchain in accordance with the present invention.

16*e*-2 illustrates a display module for personally owned music files uploaded and legered on blockchain in accordance with the present invention.

16*e*-3 illustrates a display module for personally owned png or jpeg images uploaded and legered on blockchain in accordance with the present invention.

16*e*-4 illustrates a display module for personally owned gifs uploaded and ledgered on blockchain in accordance with the present invention.

16*e*-5 illustrates a display module to set POPtoken value, license payment and performance graphics in accordance with the present invention.

16*e*-6 illustrates a user display to set POPtoken value for audience views sourcing in other users POPcasts in accordance with the present invention.

16*e*-7 illustrates display of tittle of content and blockchain ID tax code in accordance with the present invention.

16*j* illustrates a help screen element in accordance with the present invention.

Figure 17:
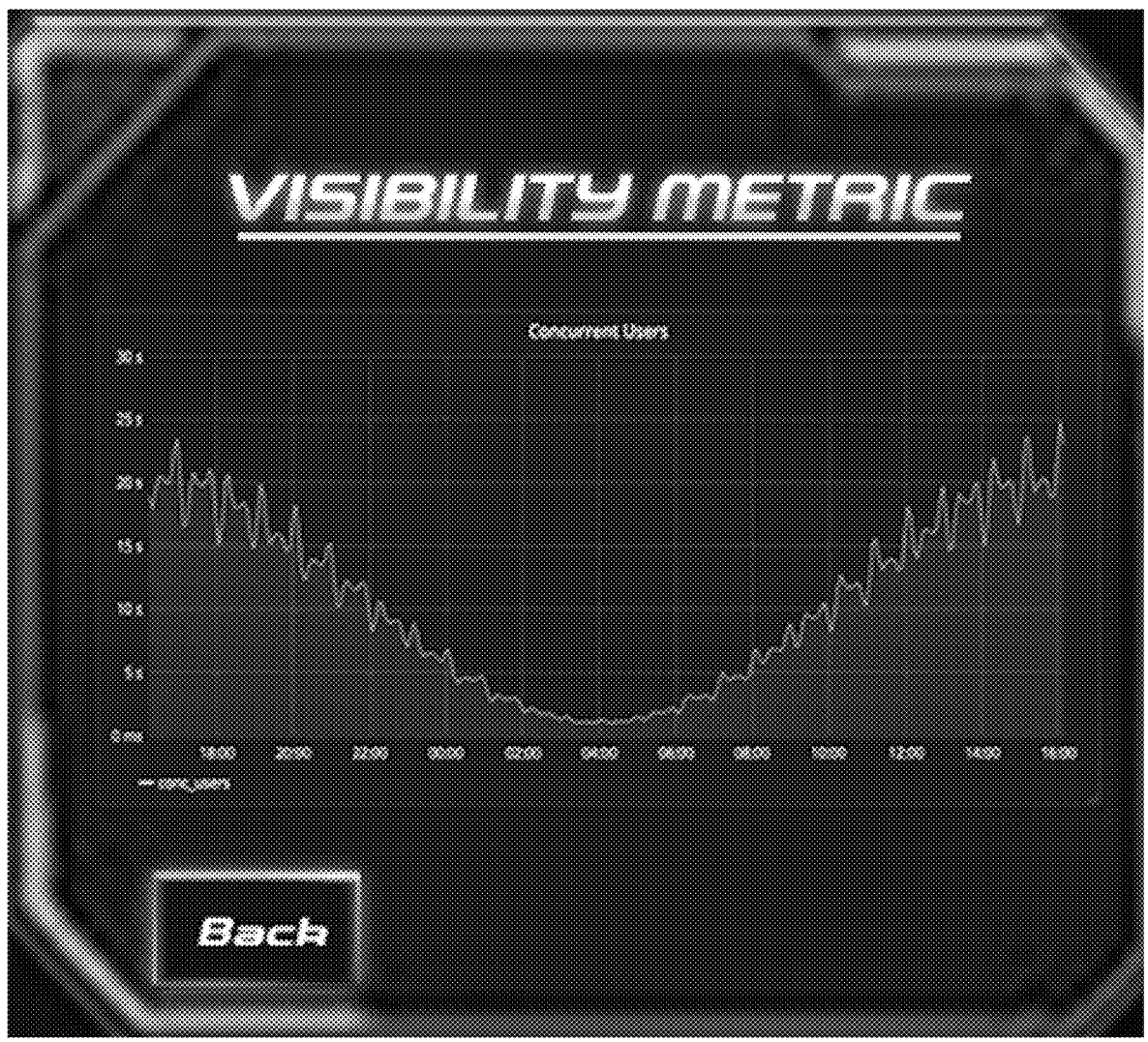

FIG. 17 illustrates exemplary statistics for desired content in use on blockchain licensed performance in accordance with the present invention.

Figure 18A:

FIG. 18A illustrates an exemplary API dashboard for aggregation and organization or a variety of use support systems in accordance with the present invention.

Figure 18B:
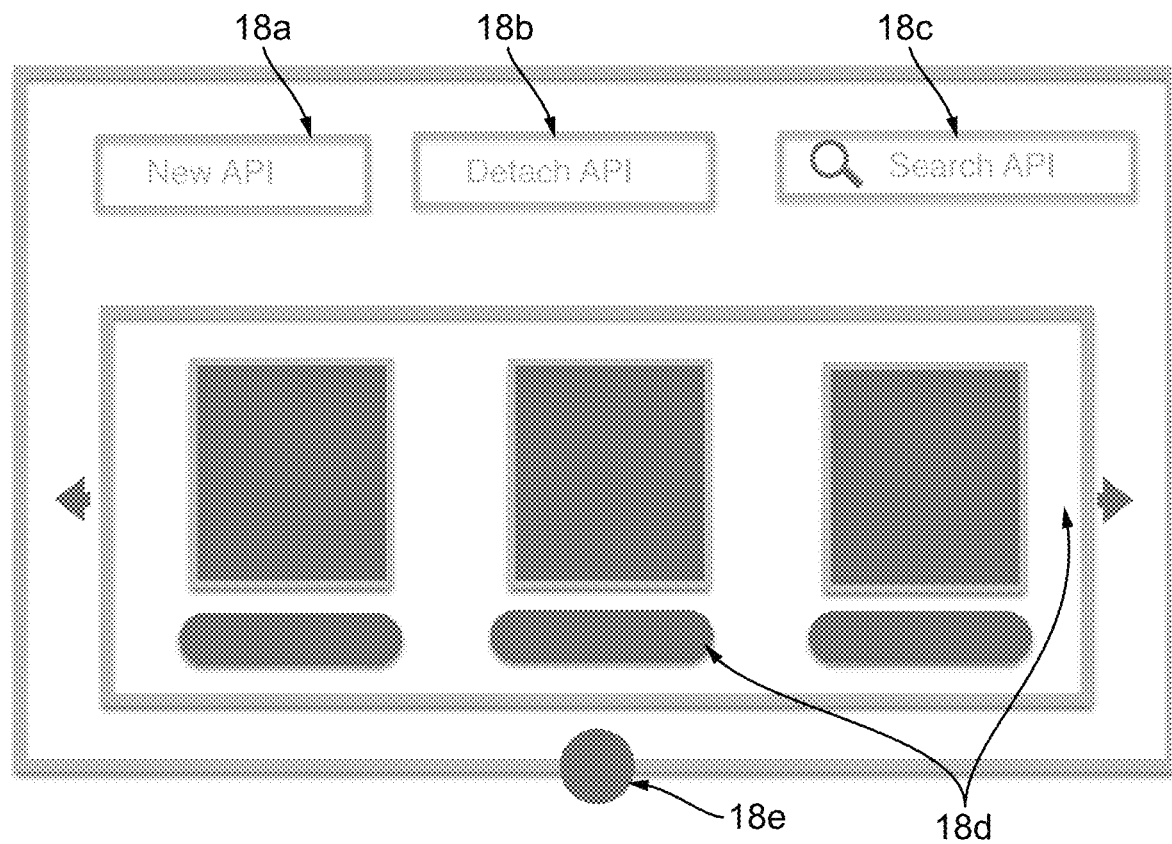

18A in FIG. 18B illustrates an exemplary system for attaching/detaching/searching of a plurality of API's in accordance with the present invention.

18*b* illustrates the cataloguing of APIs by type of aggregated platforms and/or subscriptions in accordance with the present invention.

18*c* illustrates access to a help screen in accordance with the present invention.

18*d* illustrates categorical access modules to themes in API integrations in accordance with the present invention.

18*e* illustrates a help screen element in accordance with the present invention.

Figure 19A:

FIG. 19A illustrates an exemplary dashboard for controlling features of the blockchain ledgering service in accordance with the present invention.

Figure 19B:
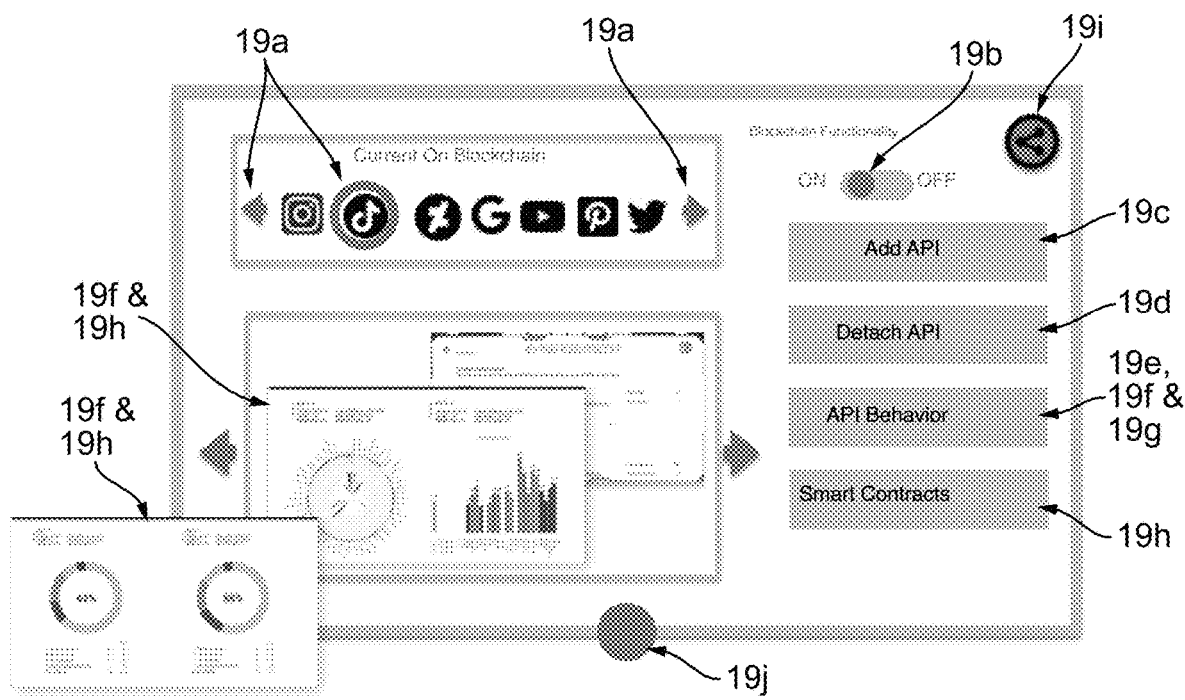

19*a* in FIG. 19B illustrates a display of current APIs on the blockchain selector ring and scroll slider in accordance with the present invention.

19*b* illustrates an exemplary on/off blockchain switch in accordance with the present invention.

19*c* illustrates an add API element in accordance with the present invention.

19*d* illustrates a detach API element in accordance with the present invention.

19*e* illustrates one of three exemplary behavior reports in accordance with the present invention.

19*f* illustrates two of three exemplary behavior reports in accordance with the present invention.

19*g* illustrates three of three exemplary behavior reports in accordance with the present invention.

19*h* illustrates an exemplary open/fulfilled smart contracts function scroll through report in accordance with the present invention.

19*i* illustrates a share option to publish reports in accordance with the present invention.

19*j* illustrates an access to a help screen element in accordance with the present invention.

Figure 20A:
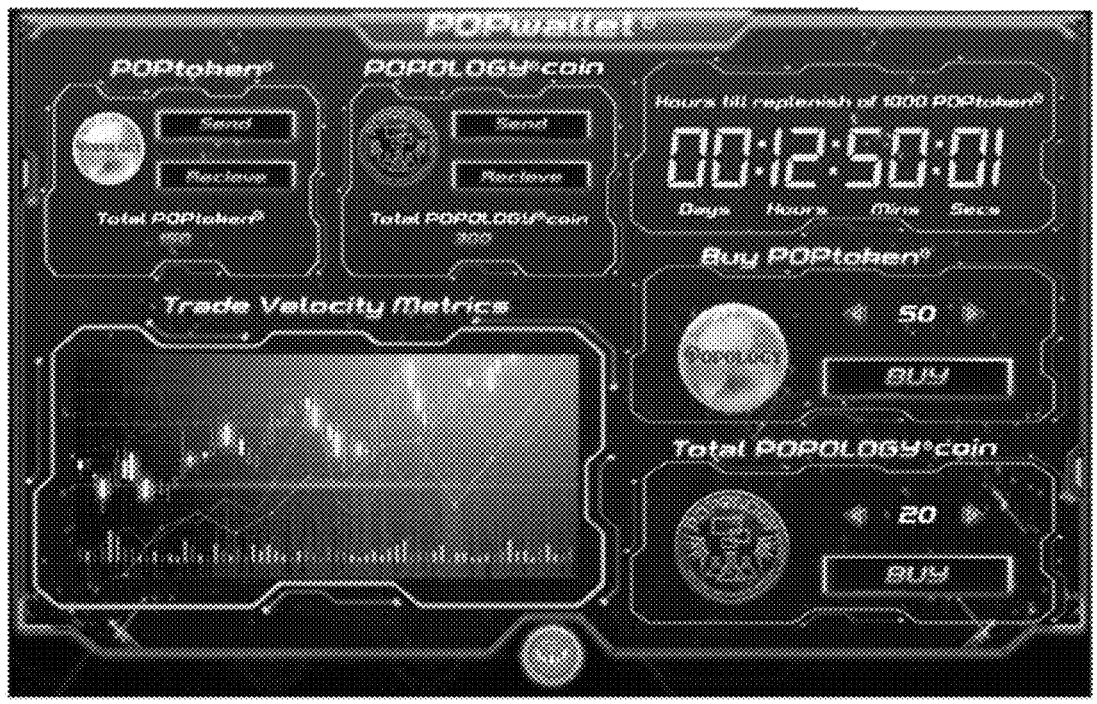

FIG. 20A illustrates an exemplary blockchain dashboard technique for controlling exemplary blockchain ledgering services in accordance with the present invention.

Figure 20B:
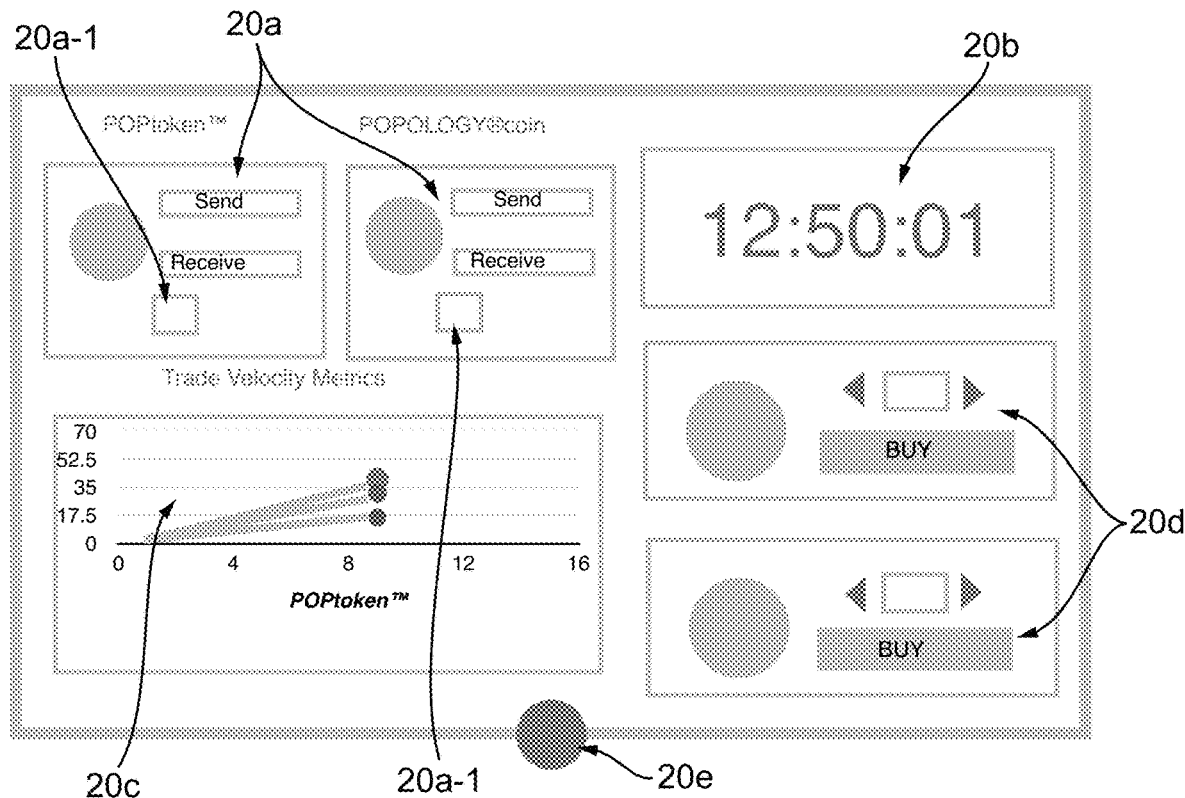

20*a* in FIG. 20B illustrates send/receive options in accordance with the present invention.

20*a*-1 illustrates a current volume element in accordance with the present invention.

20*b* illustrates an exemplary countdown clock for reboot of next added tokens/coins in accordance with the present invention.

20*c* illustrates an exemplary trade velocity metrics screen in accordance with the present invention.

20*d* illustrates an access request and volume purchase of branded crypto coin element in accordance with the present invention.

20*e* illustrates a help screen element in accordance with the present invention.

Figure 21A:

FIG. 21A illustrates an access of exemplary techniques for implementing a video link processing pipeline in accordance with the present invention.

Figure 21B:
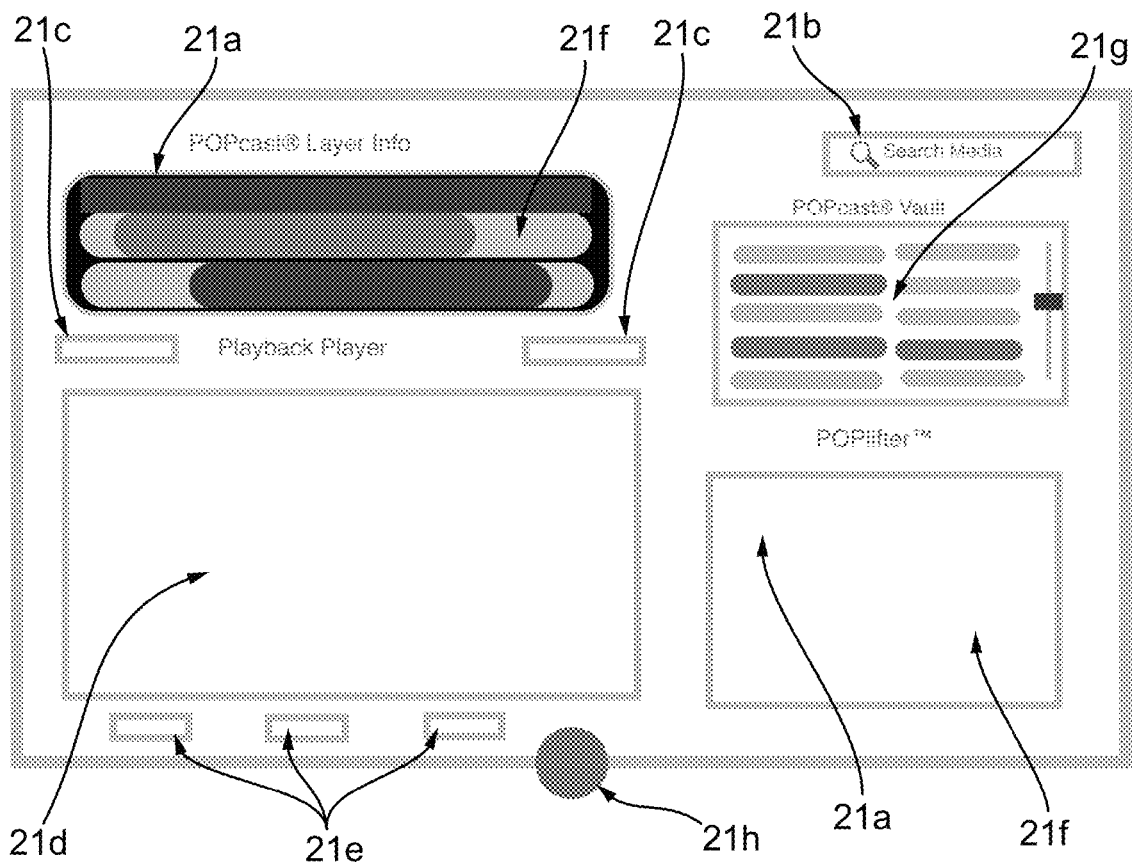

21*a* in FIG. 21B illustrates an exemplary custom in-point/out-point module in accordance with the present invention.

21*b* illustrates media search and add options for an exemplary POPcast in accordance with the present invention.

21*c* illustrates POPcast/publish lifted media clip elements in accordance with the present invention.

21*d* illustrates an exemplary playback player for previewing edited in/out posts of a URL link in accordance with the present invention.

21*e* illustrates various functionality relative to POPcast editing in accordance with the present invention.

21*f* illustrates visible audio layers over preexisting audio of a video link in accordance with the present invention.

21*g* illustrates a vault containing unpublished/published POPcast streams in accordance with the present invention.

21*h* illustrates a help screen element in accordance with the present invention.

Figure 22A:
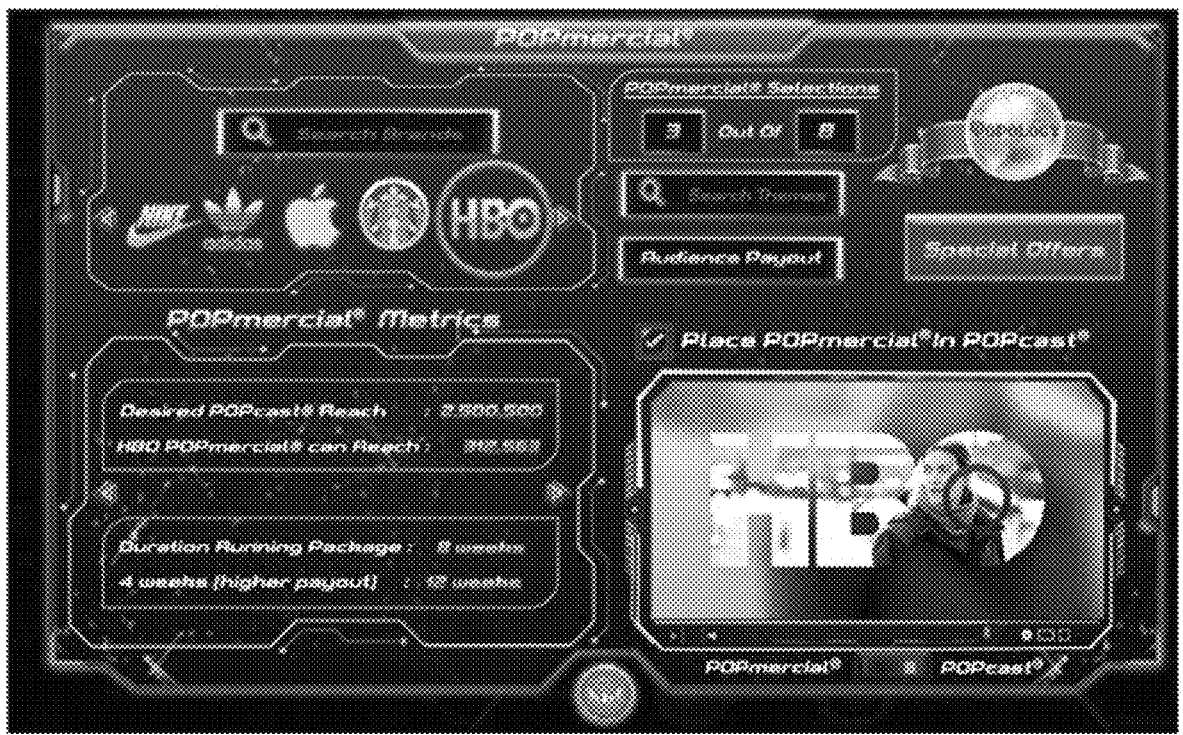

FIG. 22A exemplary dashboard for placement of advertising campaigns in a streaming POPcast in accordance with the present invention.

Figure 22B:
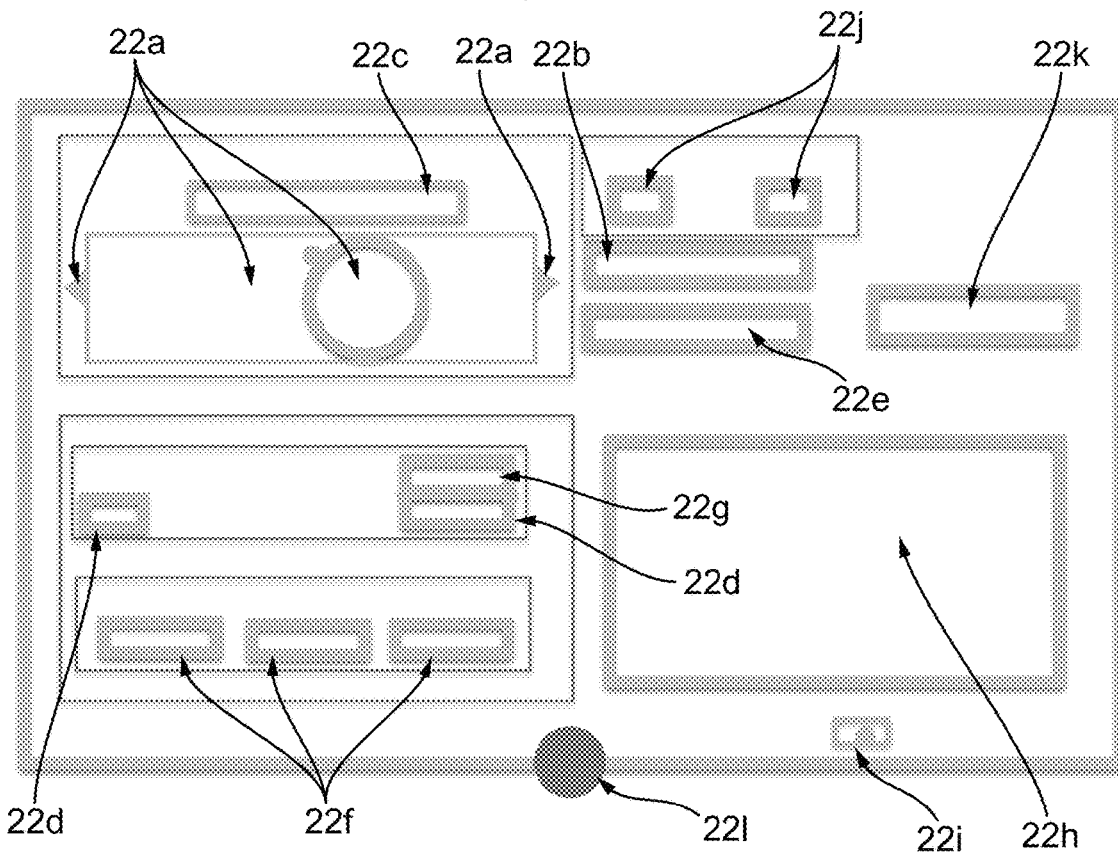

22*a* in FIG. 22B exemplary slider and selector ring element in accordance with the present invention.

22*b* exemplary search bar for advertisement brands in accordance with the present invention.

22c exemplary filtering element for brand selection process in accordance with the present invention.

22d exemplary media buy element in accordance with the present invention.

22e exemplary audience payout element in accordance with the present invention.

22f [exemplary ad deployment element schedules duration of user selected advertising placed as media-buy for set durations of 4 weeks, 8 weeks, or 12 weeks as options.

22g exemplary metric formula as algorithm tallies all current views of each selected media in (POPcast) stream and divides this total number by an inflationary 20% accomplishing "Desired POPcast REACH" metric to push to audiences. Video Reference for clarity on our https.//youtu.be/O18dTurRmR0 is incorporated herein by this reference.

22h exemplary POPmercial media player in accordance with the present invention.

22i exemplary POPcast playback switch in accordance with the present invention.

22j exemplary POPcast counter element in accordance with the present invention.

22k exemplary search window for special offers presented by brand sponsors in accordance with the present invention.

22l exemplary help search window in accordance with the present invention.

Figure 23A:

FIG. 23A exemplary POPwager dashboard facilitating the "Futures In Popular" feature in accordance with the present invention. FIG. 23C confirms a smart contract showing a stake and mining wager in connection with the "Futures in Popular" feature.

Figure 23B:
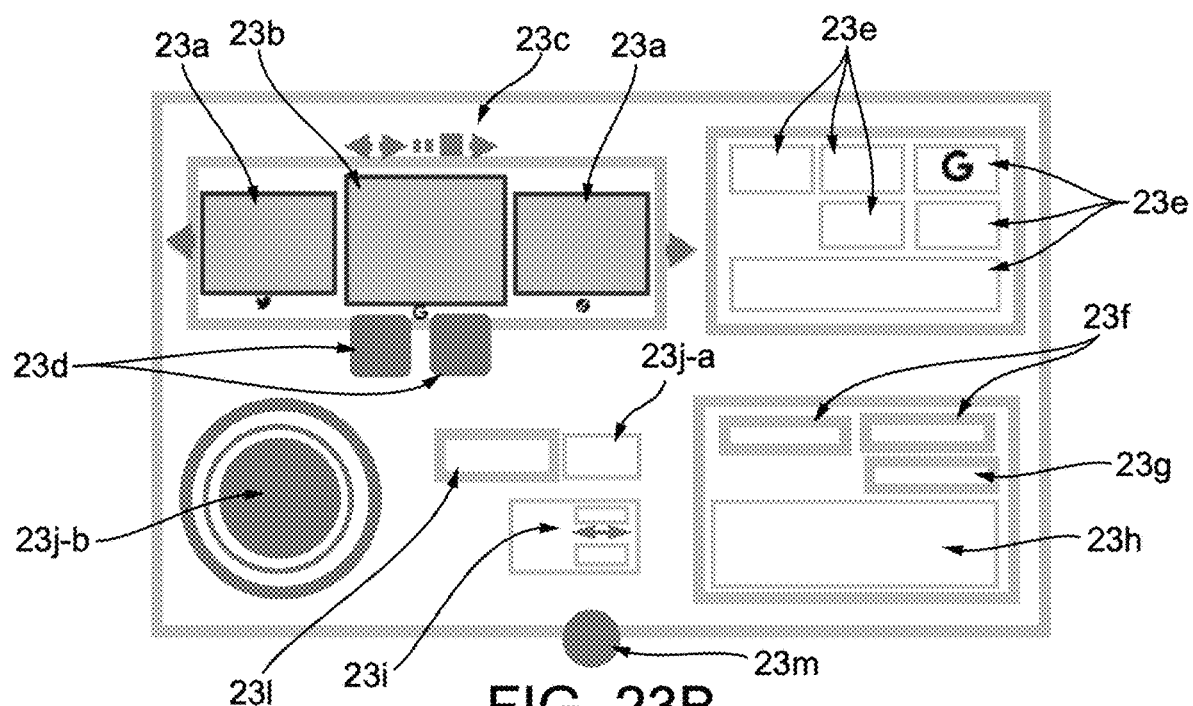
Figure 23C:
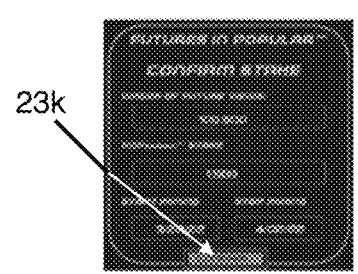

23a in FIG. 23B exemplary slider media tile element in accordance with the present invention.

23b exemplary wager engagement element in accordance with the present invention.

23c exemplary media play controls for FIG. 28(b) in accordance with the present invention.

23d exemplary audio/video control element in accordance with the present invention.

23e exemplary media stats element in accordance with the present invention.

23f exemplary media start/stop date element in accordance with the present invention.

23g exemplary media view entry element in accordance with the present invention.

23h exemplary graphic display of media ROI in accordance with the present invention.

23i exemplary window for entry of stake amount in accordance with the present invention.

23j and 23j-a exemplary window for regulation of stake in accordance with the present invention.

23k exemplary withdrawal window from POPwallet in accordance with the present invention.

23l stake amount display element in accordance with the present invention.

23m exemplary help element in accordance with the present invention.

Figure 24A:
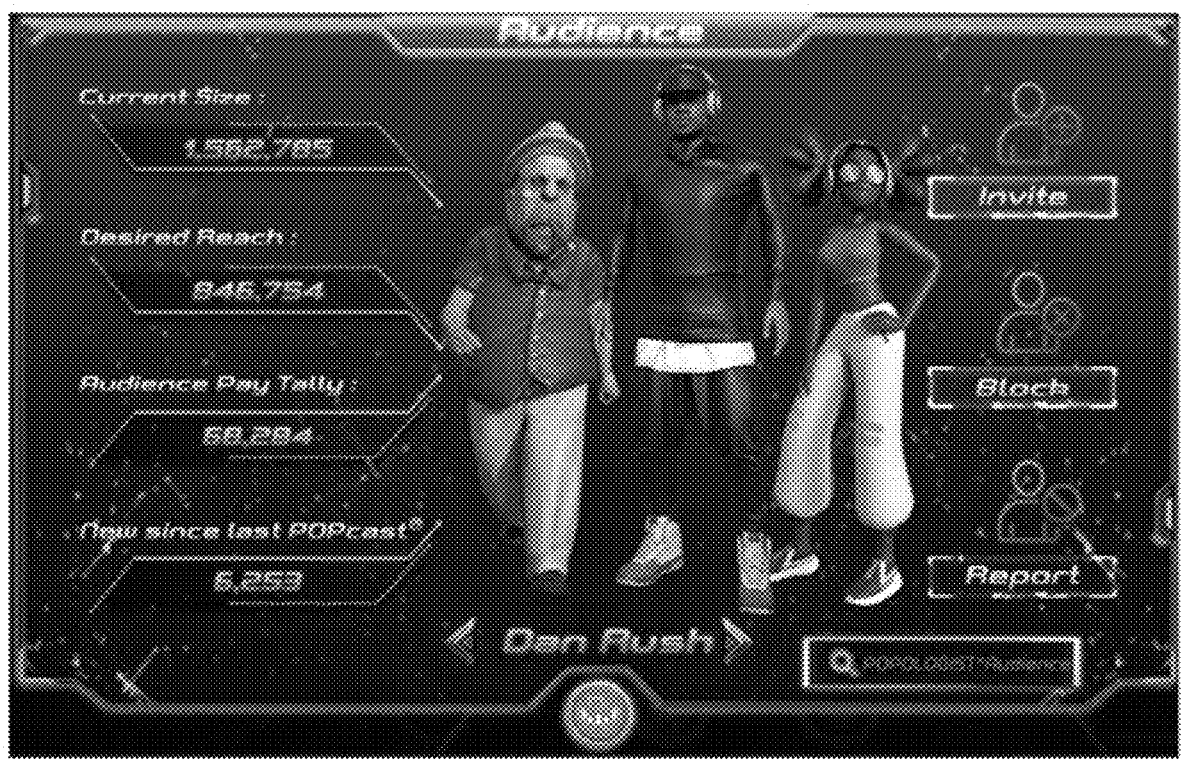

FIG. 24A exemplary audience dashboard in accordance with the present invention.

Figure 24B:
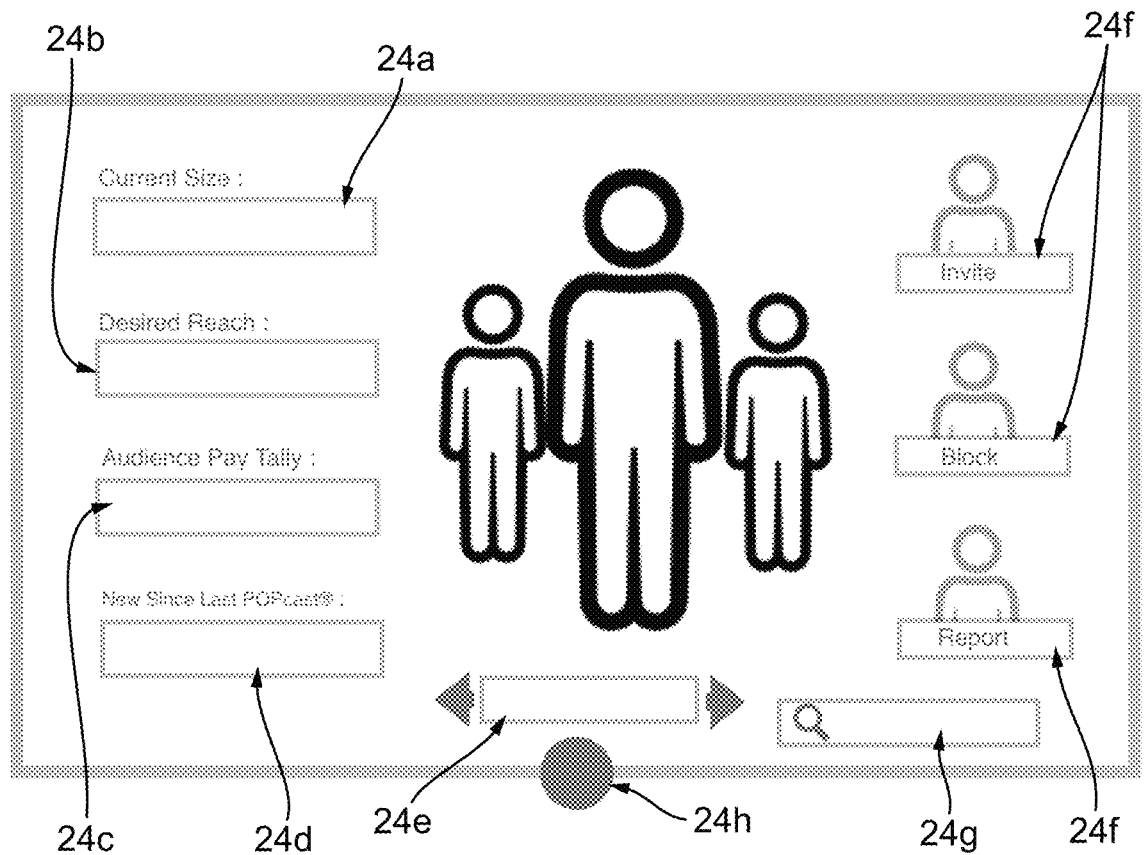

24a in FIG. 24B exemplary audience size window in accordance with the present invention.

24b exemplary window for audience reach in accordance with the present invention.

24c exemplary window for POPtoken payouts rewarded to audience in accordance with the present invention.

24d exemplary window for tabulation of new audience members from last deployed POPcast in accordance with the present invention.

24e exemplary window of user ranking stats in accordance with the present invention.

24f exemplary modules of audience relations such as invite/block/report in accordance with the present invention.

24g exemplary search window for user/POPOLOGIST in accordance with the present invention.

24h exemplary access button to help screen in accordance with the present invention.

Figure 25A:

FIG. 25A help screen—exemplary block diagram for aggregation/organization of multimedia data support systems in accordance with the present invention.

Figure 25B:
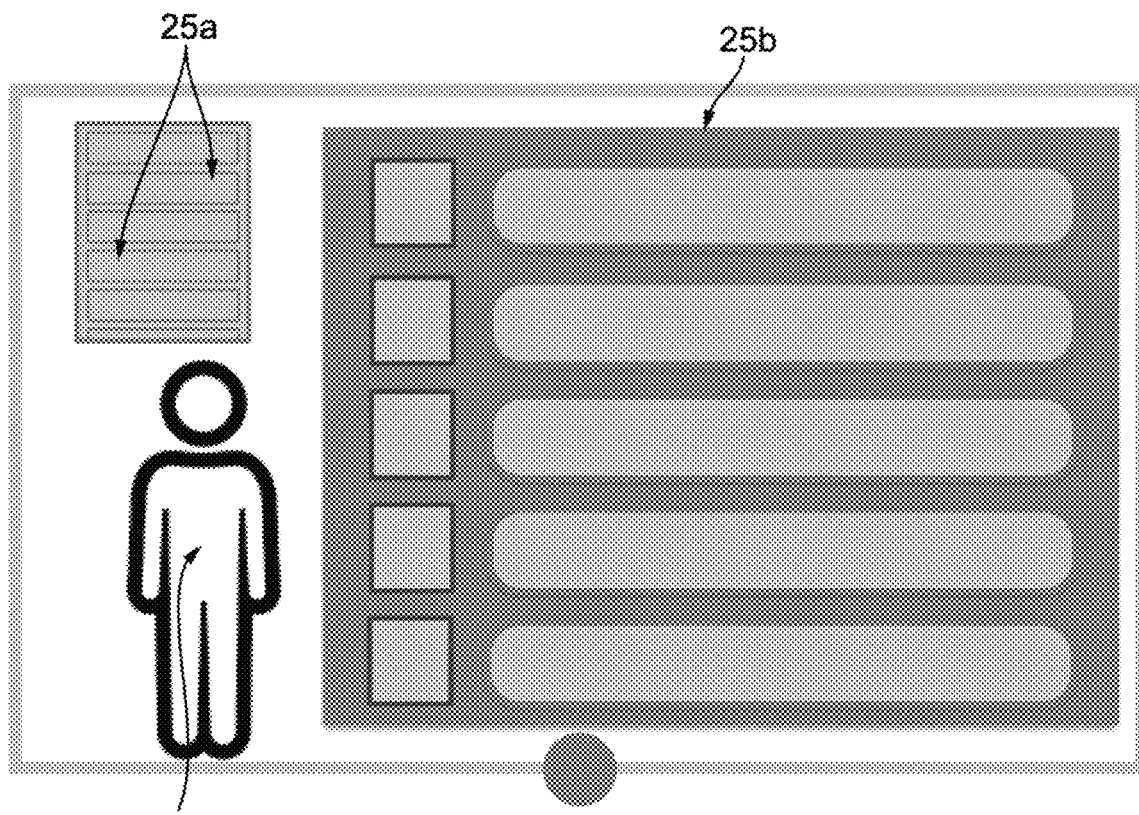

25a in FIG. 25B exemplary navigation portals in accordance with the present invention.

25b exemplary help instructions for each functionality prompted in 25c exemplary "help avatar" gestures of interactive responses in accordance with the present invention.

Figure 26A:

FIG. 26A exemplary POPlounge dashboard for aggregation/organization in accordance with the present invention including switch between TV shows (FIG. 26c and feature films (FIG. 26d).

Figure 26B:
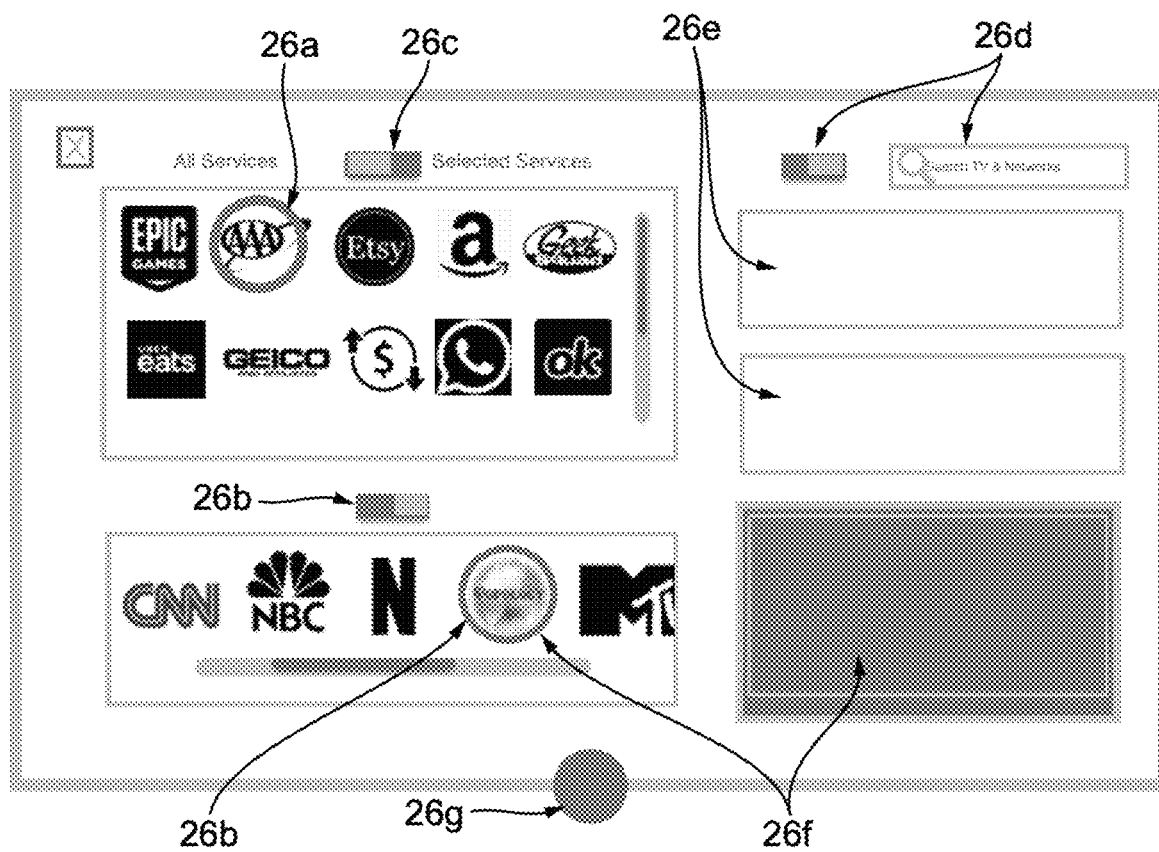

26a in FIG. 26B display of exemplary business API services via selector ring element in accordance with the present invention.

26b exemplary switch between TV Networks or POPcast content by other users in accordance with the present invention.

26c exemplary switch between services/select services in accordance with the present invention.

26d exemplary search and switch element between TV shows/feature films in accordance with the present invention.

26e display of exemplary record keeping of online hours used and data merchandised from plurality of API services measured in megabytes for issued rewards in POPtoken.

26f exemplary onboard media player for enabling streaming VOD or TV network viewable for data mining rewards inside web app in accordance with the present invention.

26g exemplary access to help screen in accordance with the present invention.

Figure 27A:
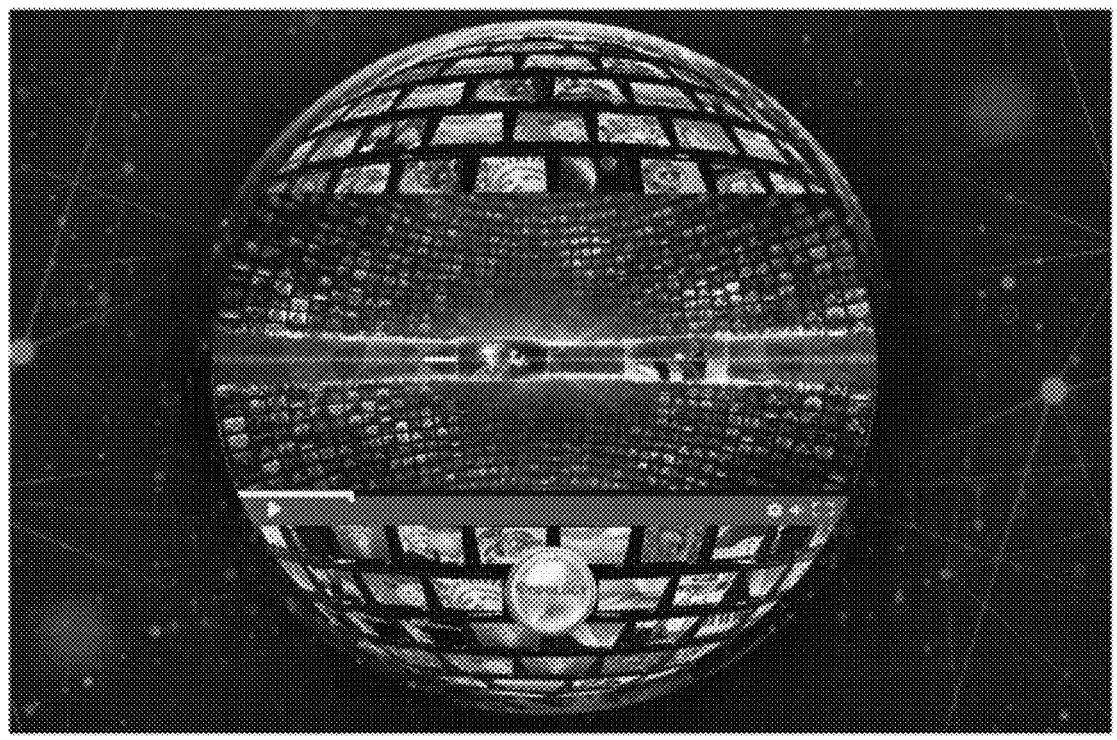

FIG. 27A POPcast media player with exemplary viewing techniques in accordance with the present invention.

Figure 27B:
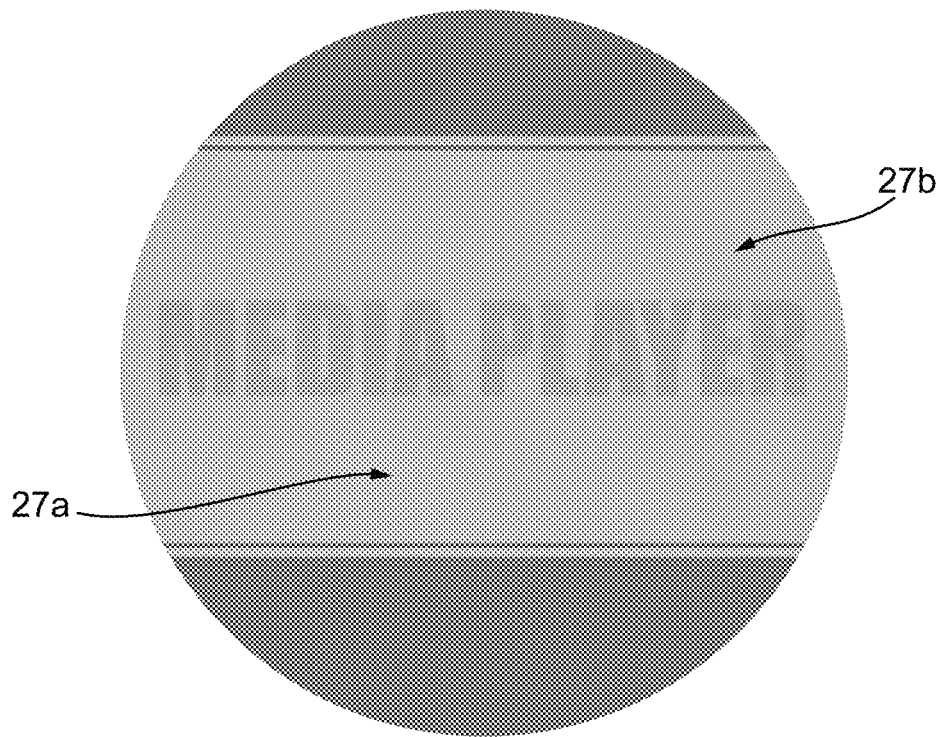

27a in FIG. 27B exemplary non-scrubbable media player for user POPcast with POPmercial in accordance with the present invention.

27b exemplary watch code in accordance with the present invention.

Figure 28:
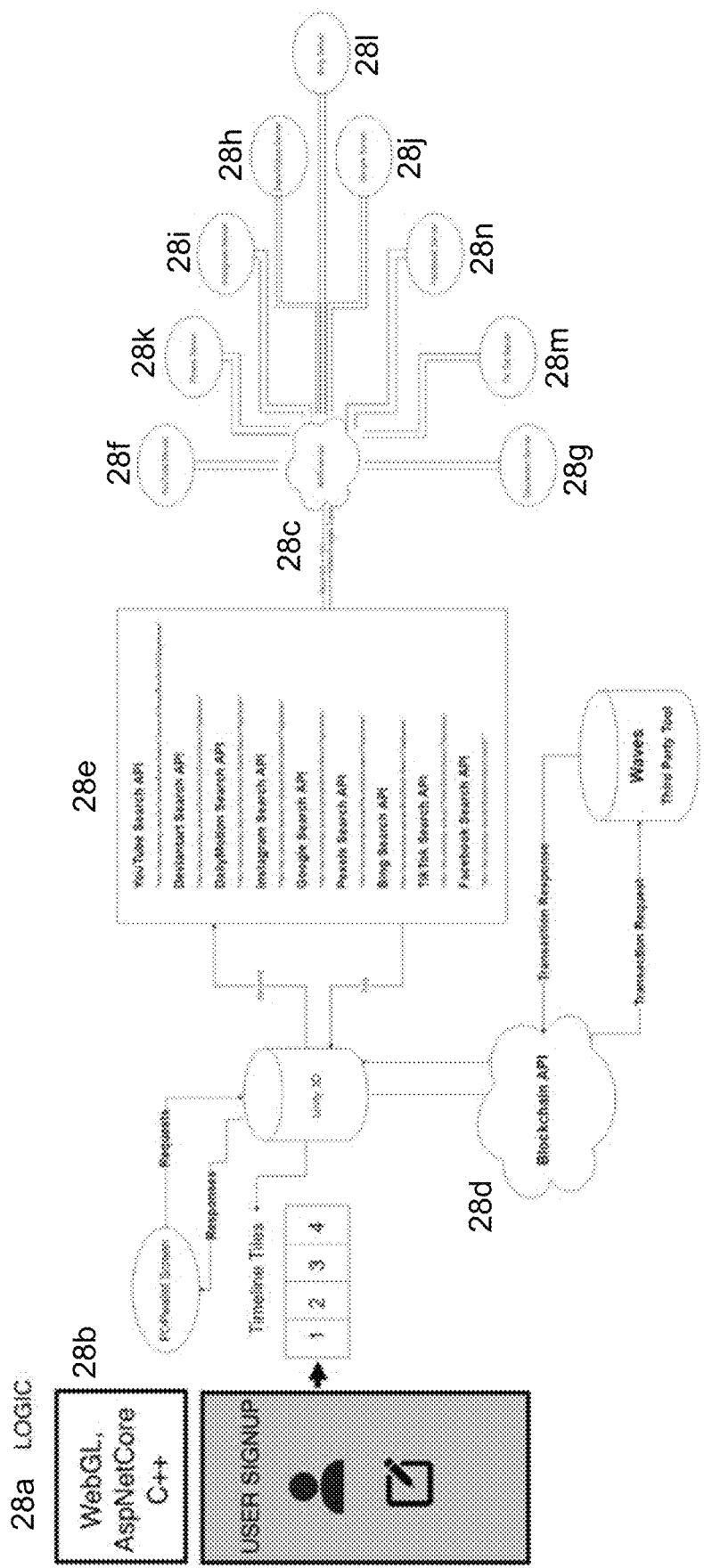

FIG. 28_exemplary LOGIC in a dashboard of an exemplary system for aggregation and organization.

28a exemplary displays of software used as system for data retrieval and archive for first time users.

28b & 28d references API with blockchain services (dashboard element FIG. 19A) services displayed 28c for active use as restFUL APIs.

28f, 28g, 28k, 28m, 28l, 28n, 28h, 28j, 28l in FIG. 28 being called into UNITY 3d interface with a drag and drop element to choose digital rights that are populating interface for placement in publishable media stream, acting as a NON FUNGIBLE TOKEN asset holding audience crypto payouts for viewing.

Figure 29:
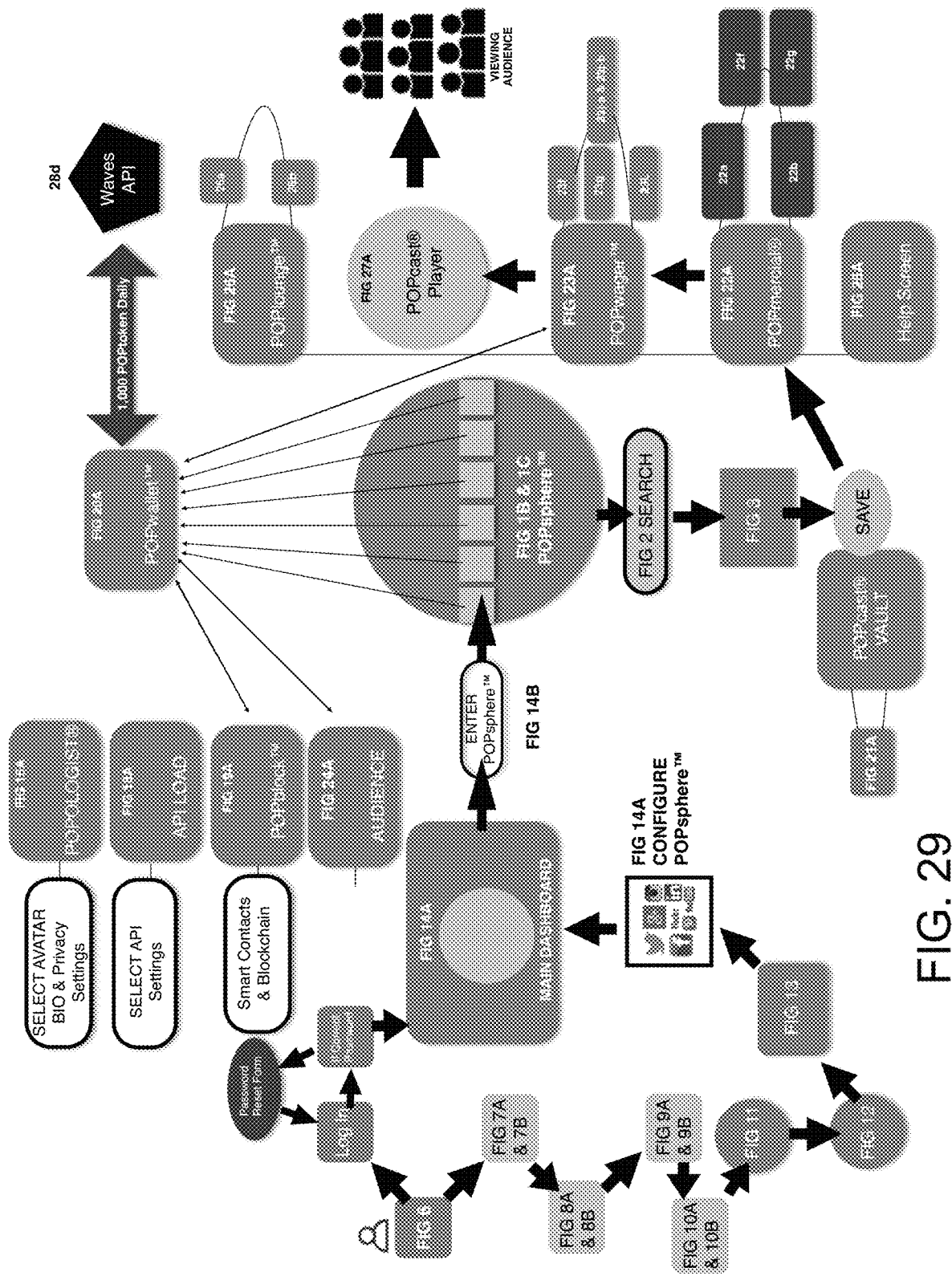

FIG. 29_exemplary overall Import and flow of Digital Rights in an immersive 360-degree workspace of an exemplary system for aggregation and organization of digital rights and APIs that source them. FIGS. 6 through 13 exemplary details from first time user intake through to publish of stream while accruing data-credits (FIG. 26A) for API behaviors (FIG. 19A) active on & off platform.

Figure 30:
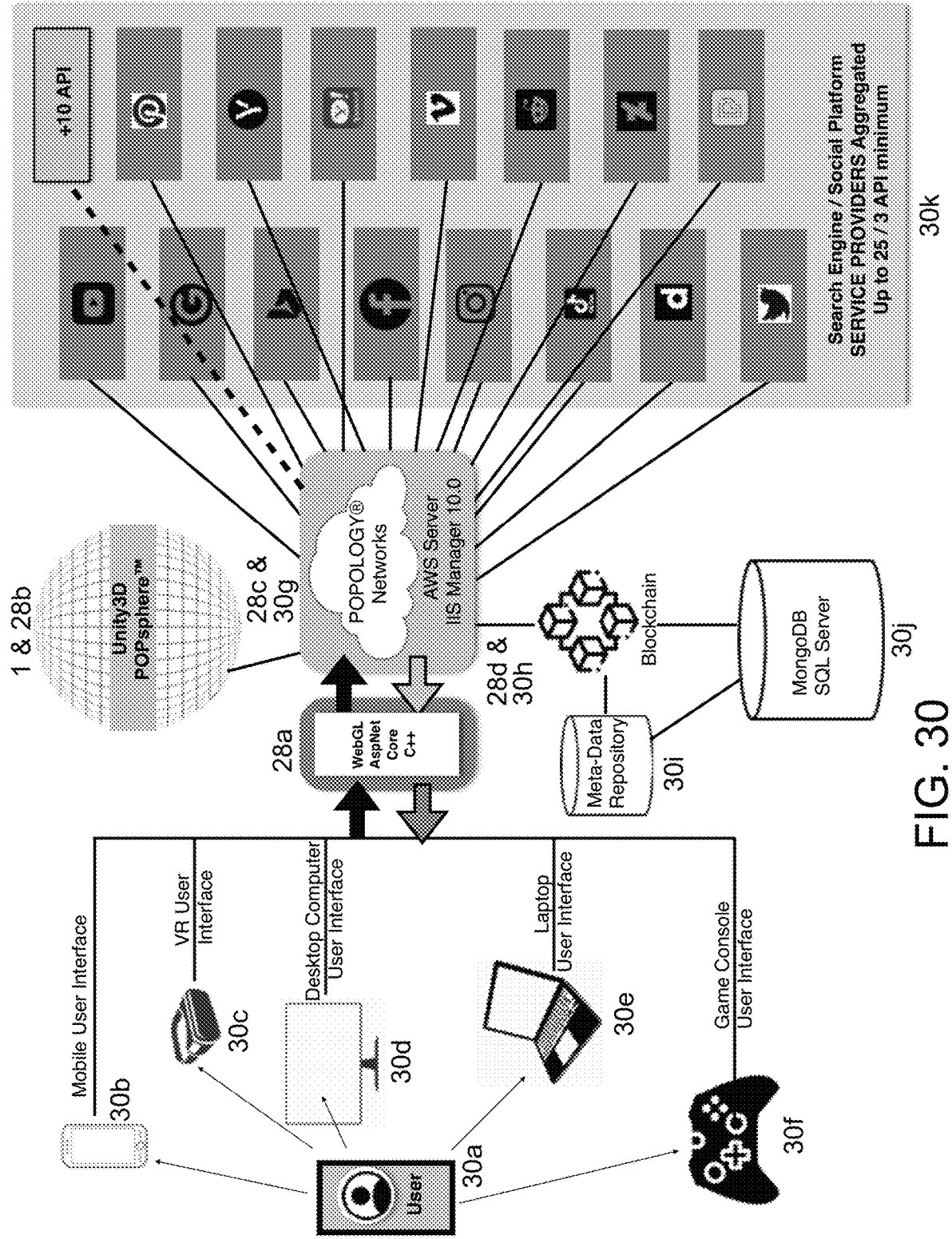

FIG. 30 together with 30a illustrate a use and a plurality of device connections to their connectivity of integrated platform components in accordance with the present invention.

30b illustrates mobile device connections in accordance with the present invention.

30c illustrates Virtual Reality Headset device connections in accordance with the present invention.

30d illustrates Desktop Computer device connections in accordance with the present invention.

30e illustrates Laptop Computer device connections in accordance with the present invention.

30f illustrates Game Console device connections in accordance with the present invention.

30g illustrates IIS Manager/web administrators to modify website options, such as default pages, error pages, logging settings, security settings, and performance optimizations. IIS can serve this dynamic webpage, incorporating ASP-.NET applications and PHP pages.

30h illustrates blockchain connections (also 28d in FIG. 28) in accordance with the present invention.

30i illustrates the Meta-Data coming from API elasticSearch Repository parsed from the SQL Server to feed the POPblock (19e, 19f, & 19g of FIG. 19B) & POPwager (23e of FIG. 23B) dashboards with connections to MongoDB program in accordance with the present invention.

30j illustrates the primary Database holdings collected from MongoDB and the SQL Server to feed the Meta-Data Repository (30h) in accordance with the present invention.

30k illustrates the aggregated social and search platform algorithms feeding into networks via keyword search and populating video/photo content to the POPsphere™ user interface. Up to 25 APIs as little as 3 APIs can be included.

DETAILED DESCRIPTION OF THE PRESENT INVENTION

The following is a description of one or more exemplary embodiments of the present invention. POPOLOGY is a digital platform for media rights, intellectual property rights, payments and indexing. Unlike other Social Media platforms, POPOLOGY is designed to reward curators and creators of media content. To do this, POPOLOGY Networks indexes and computes key metrics designed to measure true popular. These key metrics trace the foundations of democracy, following the ideas that percolate, by and for the people. This index is tabulated using the world's most powerful blockchain technology, to create a shared, secure ledger. This is served to everyone using a POPOLOGY web-based app.

Using the POPOLOGY blockchain ledger, the Key Performance Indicators (KPIs) can be automatically tallied and securely shared. These KPIs can be used to create digital tokens and coins on the POPOLOGY blockchain ledger. The value of these digital tokens and coins will be backed by the media network's ad revenues and trade velocity. This allows POPOLOGY networks to share ad revenue with the artists, players and curators, in exchange for KPIs.

POPOLOGY Networks minted 2 digital currencies: POPtoken and POPOLOGYcoin. POPtoken can be used with the Prize Wall, a collection of promoted items that can be delivered directly to the consumer. For tax compliance reasons, POPtoken cannot be directly exchanged for fiat currency, like the US dollar.

POPtoken can be exchanged for POPOLOGYcoin. POPOLOGYcoin can be used with the Store Front, a collection of premium promoted items and tickets for live experiences. These items have a value in US dollars, and POPOLOGYcoin exchanges may be subject to gift tax. Unlike POPtoken, POPOLOGYcoin can be exchanged for fiat currency, like the US dollar. This will put POPOLOGYcoin in the same fiat exchange as other crypto to spend on retail sites like Amazon.

A curator can earn tokens by curating content into a POPcast. Simply create a playlist, add brands for POPmercial ad spots, and share with players. When players consume the content and view the POPmercial ad spots, new POPtoken are distributed to the player, the curator, and the copyright holder.

A curator can earn more tokens by predicting the future of popularity of their POPcast. Wager your POPtoken in "Futures in Popular". If your predicted view count is reached before the prediction time limit, you win POPtoken!

A prospector can earn tokens by predicting the popularity of a piece of media. Simply select a piece of media, see the historical view counts, and make a prediction. Wager your POPtoken in "Futures in Popular". If the predicted view count is reached before the prediction time limit, you win POPtoken!

A curator can receive rewards from sponsors with their POPcast Sponsor Wall. The top contributing sponsor appears at the top of the Sponsor Wall. Each sponsor's contribution of US dollars is exchanged for a verified spot in the blockchain ledger, known as an NFT (Non-Fungible Token).

This POPtoken goes into the POPcast curator's digital wallet. In exchange, the list of NFT sponsors appears on the Sponsor wall for the POPcast. This kind of entry in the POPOLOGY blockchain ledger showcases the power of smart contracts and digital micro-licenses.

Only an NFT Sponsor gets the option to purchase the creation an officially licensed, limited edition trading card. This trading card has the cover art of their sponsored POPcast. It also contains a Bluetooth App Clip sticker as proof of authenticity. Scan the sticker with your phone and see the NFT Sponsor Wall. In this shared secure ledger, you can see when the Collectible Trading Card was commissioned, who commissioned it to be made, and the total number of officially licensed cards like this one. These large cards are 5.63×3.31" in size and look great on a table or shelf of collectibles. Extra-Large cards are 24×36" in size, look great on an award wall, accent table or hallway. The proceeds from these Collected Trading Cards go to the curator of the POPcast. An optional acrylic display case makes a great addition, to showcase your support for the arts.

Looking for a rare limited edition 12" Vinyl LP to showcase? An NFT Sponsor gets the exclusive option to purchase the creation of an officially licensed, limited edition Vinyl Record of the POPcast. This Vinyl record has the cover art of their sponsored POPcast. The sleeve notes include the artists and track information. The record sleeve itself contains a Bluetooth® App Clip sticker as proof of authenticity. Scan the sticker with your phone and see the NFT Sponsor Wall. In this shared secure ledger, you can see when the Collectible Vinyl Record was commissioned, who commissioned it to be made, and the total number of officially licensed Vinyl Records like this one. An optional acrylic display case makes a beautiful addition to your shelf of collectibles. Showcase your support for the arts. The music royalties for each track, and the curator's royalties are all entries in the POPOLOGY blockchain ledger. What used to be an impractical hassle of phone calls and paper contracts, can now be accomplished with a modern digital smart contract for micro-licensed content. All micro-payments in royalties paid. That's the power of the POPOLOGY blockchain ledger.

Are you a popular curator? The most popular curators will get noticed by brands. These brands can interact with these curators using POPOLOGY Networks.

Want the curator to like your product? Send them a promotional gift!Curators have the power to select which brands are included in their POPcast POPmercial ad gallery of spots. This connection is how your brand can reach audiences in a real authentic way.

Join the Sponsor Wall. Want a curator to take notice? Send them a payment of gratitude. The top sponsor of a POPcast is seen by the Players and the Curator POPOLOGIST.

Commission Collectibles. As a member of the Sponsor Wall, you can purchase officially licensed and verified collectible Trading Cards and Vinyl Records. Fit in museum-quality displays, with a digital certificate of authenticity, verified with a special sticker and the POPOLOGY blockchain ledger.

POPOLOGIST Spotlight. Assemble your crew of popular curators. Put them in the POPOLOGIST Spotlight. These promoted crews of popularity ambassadors help you reach your targeted audience in an authentic way. Percolate fresh thinking with POPOLOGIST talent.

Brand Ambassador Collaborations. Bring your brightest curators into your marketing meetings. Your high value POPOLOGIST Brand Ambassadors will help you refine your messaging strategy for your ad campaigns. Infuse your brand with a natural authenticity that really resonates with your audience.

Grant Talent Towards the POPOLOGY Academy for Media Arts. This organization for the arts and sciences is a 501c3 licensed charity. Dedicated to educating K-12 students in filmmaking, philosophy of storytelling and promotions. The next generation of storytellers will have e-learning modules for confident self-expression. Additional studio facilities are available to teach resident artists to make high-quality media.

Grant Talent Awards. Nominate your favorite talent to the annual POPOLOGY Academy for Media Arts Awards Show. This promoted talent will get a feature profile, art review, and editor's pick. The talent will also receive this year's prize package. Includes a year of grant funds and artist residency.

Disruptive Characteristics

Ability to curate your own meta-search engine formula for video and photo content. We enable a user to populate over 2400 video/image stories per pages (in the round) for any search topic from minimum 3 to maximum 25 user platforms selected (aggregated) by the user. The POPsphere automating a unique configuration of trusted search engines and/or social platforms as an immersive content browser. User is able to pre-select and cluster individual data pools into color coded tile continents facilitating a unique attribute of search criteria. Which allows a user to control the unique attributes of information. This ostensibly defines and limits misinformation campaigns via sheer volume of aggregation, and levels the playing field of competitive landscape platforms.

Customizable aggregation of search engine results through permitting users to select their preferred search algorithm, which activates the IConfiguration as an interface for Net Core 2.0. The IConfiguration interface is injected as dependency in the Controller and then later used throughout the Controller. The IConfiguration interface is used to read Settings and Connection Strings from App Settings into json file. Now when a user with bundled AP algorithms is selecting originative content, they are additionally generating a completely unique one-of-a-kind algorithm. Potential arises for curating one's own multimedia content based on each individual's specific selected interests, creating a unique experience of content discovery and consumption through the special design of the Application Environment/UI/UX, consisting of a 3600 scrollable spherical area lined with 2400 rectangular content windows gathering results from 3 to 25 user selected platforms such as Facebook, Instagram, Daily Motion, Youtube, TikTok, and Google etc, named the POPsphere. The size of the content roster presented at-a-glance permits cross-checking of contrasting content, encouraging objective assessments, and diminishing efficiency of mis-information campaigns, as well as entirely eliminating the echo-chamber effect.

POPOLOGY user assembles a POPcast which allows our users to now place numerous of their favorite choices in sponsored brand ads (POPmercial) into their curated media stream, which facilitates automated brand retention and relevance statistics as required gamification of this platform, and rewards the viewing audience with POPtoken. A user-oriented income generation mechanism is developed by the introduction within the POPcast as a section of the application where users can watch and place commercials (POPmercial) at will, in the interest of being paid a portion of the cost of advertising in the form of POPtoken. This introduces extensive gamification, customizable data retention and processing that targets commercials based on user-defined interests for brands where interest is already present, in addition to the seamless integration within the consumed curated content collection.

Unique Stake and Mining premise that collects data of true popular metrics and enables proof of work for mining in app tokens to prospect correct audience views in a selected duration of time wagered. We can attribute an energy saving "green" premise with our stake and mining process due to the lack of high-volume energy consumption replaced with the "VIEWS" counter of each platform aggregated that satisfies the needed quantum math required for "Proof of work". The missing numbers in this blockchain node requirement are the Future views number and duration of time selected to stake (or proof of work) against. We call this "Futures In Popular", and is truly innovative as a formula for mining our POPtoken. The Stake and "Green Mining" premise introduces additional rewards through collection of data on the subject of "true popular" metrics. This enables a unique implementation of proof-of-work (a form of cryptographic proof in which one party proves to others that a certain amount of a specific computational effort has been expended), and a novel mechanic for mining in app tokens while assuring value creation through user-provided weightings. A wagering mechanism is introduced to expand the active earning potential on the basis of predicting future video views on a user-defined time frame and with a user-selecting staking amount. An essential target achieved by the aforementioned mechanics assures a green implementation, devoid of large computational need or energy consumption. The uniquely accessible value of the VIEWS counter participates in the crypto-graphical block generation through as a unique seed contributing as a nonce to the algorithm for consensus generation.

FIG. 1 is an API Aggregation of up to 25 USER Social or Search Browser Platforms Ledgering use behaviors on the POPOLOGY Blockchain (FIG. A). FIG. 1B-1C is a POPsphere Workspace 2400 populating stores into drag and drop tiles to a publishable (1c-1) POPcast Timeline. FIG. 1D is a POPcast Timeline is a PUBLISHABLE NFT CURATION of Cross Platform VIDEO and Image Stories. Content is viable only on exclusive player tracked on the blockchain for viewing behaviors etc. 3d POPsphere Internal Console is used to access platform dashboards. 3e Top buttons access CREATE, SAVE, PUBLISH, and POPmercial Features.

FIG. 2 (Space Bar+CTRL) prompts POP-up Search Bar Feature for crossplatform keyword search, also Search Bar feature on POPsphere Console Appliance.

3a in FIG. 3, each Social API aggregated is masked into a drag & droppable story tile. Social Api's are populated in groupings as "Social Media Continents" visible by color coded of the same origin of source. Population of singular search query can happen up to 25 platforms at once. 3b. Up to 76 cross platform individual api tiles can be placed into the publishable POPcast timeline. 3c. When the 360 degree POPsphere rotates counter clockwise it repopulates with new content within the "KEYWORD" perimeters. When POPsphere rotates clockwise the tiles repopulate with the history or bread crumbing effect of previous content.

FIGS. 2A & 4B Console displays the CREATE (POPcast) SAVE (POPcast) POPmercial (Sponsorship) PUBLISH (POPcast) Features/Dashboard Access.

FIG. 5. Overall Flow Diagram from Aggregation to POPcast Publish FIGS. 7 to 12 are First Time User design plates for data and configuration of profile choices as standard use cases.

Dashboard Descriptions 14a in FIG. 14B, User Assigns each integrated API Identity on outer POPsphere (that is not grayed out) to a volume of tiles to Populate to the inner POPsphere UI (fig ex: 90 of 2400) then cycle through each API until 2400 tiles are fulfilled as prompted. 14b. Access button element to enter POPsphere UI environment. 14c. Access Button element to Personal Profile controls and NFT content minting 14d. Access Module to configure API details and settings. 14e. Access button element to enter blockchain functionalities of each API behaviors and reports element 14f. Access button element to enter digital wallet accounting dashboard 14g. Access button element to enter POPcast project vault and POPlifter element. (In & Out points set on any link placed in POPcast) 14h. Access button element to enter POPmercial advertising placement dashboard 14i. Access button element to enter POPwager Futures In Popular (Stake & Mine Game dashboard) 14j. Access button element to enter Audience Dashboard to visualize retention, payouts and access to friends to invite. 14k. Access to help screen element 14L. Access to POPlounge dashboard screen for business services and other API access use.

FIG. 15B_POPOLOGIST Profile Dashboard is illustrating exemplary techniques for 15a. Avatar Selection and Skin Change module, 15b. Platform Logout Element 15c. Profile Picture and change pic upload element, 15d. Personal Content Upload element & 15e. NFT Gallery Viewer screen & Configure element (See Continued Diagram) 16e-1 in FIG. 16B. Display module for personal owned videos uploaded successfully uploaded and legered on blockchain 16e-2. Display module for personal owned music files uploaded successfully uploaded and legered on blockchain 16e-3. Display module for personal owned png or jpeg images uploaded successfully and legered on blockchain 16e-4. Display module for personal owned gifs uploaded successfully uploaded and legered on blockchain 16e-5. Display module for selected content file to set POPtoken value, Confirm Micro-License payment and "VIEW Performance Metric" graph 16e-6. User Display and enter value for POPtoken royalty payment for "AUDIENCE VIEWS size per Micro-Licensed assignment terms in other users POPcast use. 16e-7 Displays Tittle of Content, and Blockchain Asset ID TX code 15f. Biography Text Entry Boxes element & edit test module, 15g. Custom Settings Privacy settings, comments, recent activities etc. on/off element, 15h. Community Guidelines Sign-off element 15i. Star Ranking Platform Stat display (5-star rating) 15j. Access to Help screen. 16_Video, Music, Image and Gif Upload Gallery is a dashboard illustrating exemplary techniques for POPtoken Assignment of Micro-License Use Payments to other users, and Micro-licensed audience use size authorization, Content Metadata Title, and blockchain asset ID. Access to Help screen.

FIG. 17_Visibilty Metric is a sub and extension dashboard illustrating exemplary techniques for statistics displayed for desired content selected in use on blockchain micro-licensed performance. Back button element included.

FIG. 18A_API LOAD shows, for the purpose of illustration and not limitation an API dashboard of an exemplary system for aggregation and organization of a variety of business service, social media, gaming or other service platforms organized as data support system from a plurality of integrated APIs onboarded for a variety of use cases, including and not limited to user data reports, content ledgering and reports, digital rights ledgering and reporting, exemplary techniques for embodiments of the disclosed subject matter. 18a in FIG. 18B, Illustrates an exemplary system attaching, detaching, or searching API's to the platform user ecosphere. 18b. Catalogue of attached APIs display in slider element to view and organize by type all aggregated platforms of subscriptions. 18c Access to help screen.

FIG. 19A_POPblock is a dashboard illustrating exemplary techniques for controlling features of the blockchain ledgering service, including and not limited to overall on/off element, display of "current API's on the Blockchain integrated element, add API element, detach API element, API Behavior reports including and not limited to selected Social Media engagement report, selected social media insights and impressions report element, and a share option to publish reports to email or other. Access to help screen is also provided.

FIG. 19B_POPblock is a dashboard illustrating exemplary techniques for controlling features of the blockchain ledgering service, including and not limited to 19a, display of "current API's on the Blockchain integrated with selector ring and scroll slider element, 19b. overall on off blockchain switch element, 19c.add API element, 19d detach API element, 19e API Behavior reports including and not limited to 19f & 19g selected Social Media engagement report, selected social media insights and impressions report element, 19h_Additionally a Smart Contracts function that displays a report of open and fulfilled smart contracts scroll through report and a 19i_share option to publish reports to email or other. 19j_. is access to Help Screen element.

FIG. 20A_POPwallet is a dashboard illustrating exemplary techniques for controlling accounting of the blockchain POPOLOGYcoin and POPtoken cryptography ledgering service, including and not limited to 20a in FIG. 20B_Send, receive and 20a-1 current volume element for two branded coin creations, 20*b*_a countdown clock of 24 hours until next reboot of 1000 POPtoken to use or lose within 24 hours. 20*c*_Additionally an onboard trade velocity metrics screen supporting branded TOKENOMICS schedule as element to advise on crypto use case values. 20*d*_Module available to increment and buy additional POPtoken and POPOLOGYcoin 20*e*_Access to help screen.

FIG. 21A_POPcast is a dashboard illustrating exemplary techniques for implementing a video link processing pipeline, in accordance to the previously placed media tiles in the POPcast timeline. 21*a* in FIG. 21B_The media link can have custom "IN-POINT" and OUT-Points" set in the POPlifter module. 21*b*_A visible layer element assembles audio layers over preexisting audio of the video link with some simple filters and text titles added. Additionally, the POPlifter is a fee of 1 POPtoken per 10 seconds. 21*c*_Switcher element between POPcast and Publish Lifted media Clip 21*d*_Playback Player for preview of lifted "in and out" points of the URL link. 21*e*_ Ability to Draft, SAVE, and or select neighboring selected clip in the POPcast 21*g*_A vault of unpublished or past published POPcasts element is positioned on this dashboard as well, effectively restoring or re-publishing any POPcast assembly as a project to return to. 21*b*_Search Media from specific add media from POPcast 21*h*_Access to help screen element.

FIG. 22A_POPmercial is a dashboard illustrating exemplary techniques for viewing and placing numerous Advertising campaigns in a streaming POPcast curated by platform users. 22*a* in FIG. 22B. Brands are aggregated from first time user experience data. Slider function & Selector Ring element. 22*b*. Search Brands Element 22*c*. Spots may be filtered according to a number of advertising conditions, fields, pricing, or tagged themes evolved overtime. Recommendations may be provided other than specific campaigns, and 22*d*. this ad placement system provides user with the MEDIA BUY of the spot placed in a POPcast. Onboard options to improve existing campaigns and parameters required for a complete campaign. Campaigns may be scored or ranked according to pricing, 22*e*. Audience Payout in crypto, sentiment, intent, location, time decay, or the extent of reach. 22*f*. Each spot carries a duration and correlating audience payout packages of 4 week, 8 weeks, or 12 weeks for the user to engage and deploy. 22*g*. Several spots paired together assemble a desired POPcast reach assembled metric automated by system by calculating all media views total and dividing by 20%. 22*h*. Onboard POPmercial Media Player to view selections of spots, 22*i*. POPcast playback switch element 22*j*.Automated POPmercial Spot Counter element 22*k*. Search Special Offers 22L. Access Help Screen element FIG. 23A_POPwager is a dashboard illustrating exemplary techniques for viewing and placing proof of stake POPtoken from POPwallet holdings in an effort to mine POPtoken for guessing the projected future views of any selected content in the curated POPcast timeline already sponsored. (Futures In Popular) 23*a* in FIG. 23B facilitates a slider media function displaying 3 POPcast selected tiles at once. 23*b*. The center tile engages the POPwager gamified functions to create a smart contract stake & wager to mine token 23*c*. This media can be played back via the controls element above in the center of slider module. 23*d*. POPcast has two layer controls, audio only and Video & audio in main layer. 23*e*. In the POPmetrics element relevant meta data is bound with URL source and packaged into DATE, Duration of Media, Platform Source, Views, Likes, License Owner, and Video Title to inform user of media stats. 23*f*. Userselects Mining Prospect Start and Stop dates from drop down calendar module, and 23*g*. enters a value of their estimated guess on increase of media views in the calendar dates selected. 23*h*. Based on the wager and dates selected of the increased "FUTURES IN POPULAR" for the media a graph illustrates the MINING RETURN Calculator element via ever-evolving Algorithm of these values. 23*i*. The staking module allows a selection of POPtoken values in selected increments of 1, 5, 10, 100, and, then confirms STAKE AMOUNT 23*j*-*a*. via the element provided. 23*j*. b User hits the big round "SMASH" button to increase the wager 23*k* in FIG. 23C. Dialogue Box prompts another confirm to withdraw the POPtoken from POPwallet. 23L. STAKE AMOUNT DISPLAY element 23*m* in FIG. 23B is access to help screen element.

FIG. 24A_Audience is a dashboard illustrating exemplary techniques for viewing audience metrics on the POPOLOGY Platform, 24*a* in FIG. 24B_Dashboard facilitates a tabulation of total audience served in cumulated POPcast deployed, 24*b* a DesiredAudience Reach for increased audience (Rewarded for meeting legered goal) 24*c*_ a Combined total of POPtoken payouts rewarded to the audience. 24*d*_Tabulationof new Audience members from last POPcast deployed, 24*e*_Additionally an element of user ranking stats, and popularity visualizing member avatars facilitates user relationships and influencer retention. 24*f*_Modules that include audience relations to INVITE, BLOCK and REPORT elements. 24*g*_Search for platform users by USERNAME or POPOLOGIST Handle 24*h*_Access to help screen element FIG. 25A_Help Screen shows, for the purpose of illustration and not limitation a block diagram of an exemplary system for aggregation and organization of multimedia data support systems from a plurality of navigated feature set and platformed sources. 25*a* in FIG. 25B Navigation of overall support to access tutorials on and for the website, and each of its essential media product line portals. 25*b*_Features Help Instructions for each functionality as prompted in display stage 25*c*_"HELP AVATAR" gestures as animation prompts to illustrate interactive response from user.

FIG. 26A POPlounge Dashboard illustrates an exemplary system for aggregation and organization of 26*a* in FIG. 26B_business API services displayed for active use as restFUL APIs. with a selector ring element 26*b* Additionally a calculated Data Mining element counted in megabytes for rewards to user, 26*c*_Switcher element between ALL SERVICES or SELECT SERVICES in use case, 26*d*_Search and switch element between TV Shows or feature films 26*e* an Onboard media player that enables NETFLIX, HULU, or any streaming V.O.D. service or TV network viewable for data mining rewards inside of the web app. 26*b*_switcher element from viewing POPcast Content of other members or TV Networks subscribed by APIs Integrated. 26*g* Access to helpscreen FIG. 27A_POPcast Player is a custom link POPOLOGY Networks POPcast media player illustrating exemplary techniques for viewing a 27*a* in FIG. 27B_POPcast created by our users and deployed with a non-scrubbable media player (accessible by a link), delivering the entirety of the POPcast with POPmercial sponsors timed each 15 minutes for brand recognition. 27*b*_Each POPcast delivers a watch code at the end for audience to redeem on POPOLOGY Networks as a new user.

The embodiment in FIG. 28 presents an exemplary system built in Unity and C++ for the aggregation and integration of social media and search browser memberships to establish a unique meta-search engine to activate the API collection and calls the response from the API to feed keyword search query. 28a is the frontend interface developed in WebGL & UnityGame Engine with the backend code design in AspNetCore and C++. This embodiment (28b) generates a smart contract protocol for assigning 1 POPtoken per media tile (in the POPsphere) placed in the POPcast timeline (28c) issuable into the POPwallet (28d) after publishing. The $3^{rd}$ party blockchain wallet (waves.exchange) is a digital wallet (that allows users to store and manage their custom crypto creation (POPOLOGYcoin, and POPtoken) allotments. Blockchain API tracks and ledgers behaviors of all integrated platforms for the issuance in Smart Contract Protocols to deploy, or mine POPtoken for actions successfully accomplished. Blockchain is a system of recording information in a way that makes it difficult or impossible to change, hack, or cheat the system. A blockchain is essentially a digital ledger of transactions that is duplicated and distributed across the entire network of computer systems on the blockchain.

Search API Clusters of 28e make the calls from a keyword search/data type to pull the particular variables (data) during the process when a search request is activated (28e) for a tag keyword/data attribute. (28c) uses the Newtonsoft.Json.Linq for the API will call for namespace that provides classes that are used to implement LINQ to JSON. Classes. Class, Description. Public class, Extensions. i.e (//var client=new RestClient("https://api.vimeo.com/categories." which is incorporated herein by this reference) in 28c represents a Keyword/Video or Image search pipeline to pull from specific API servers (28f, 28g, 28,k, 28i, 28n, 28h, 28j, 28l) integrated to provide the data. A Bundled API Algorithm may be established when a user selects (integrates) a specific set of API calls (social platforms) to the POPOLOGY platform and the controllers are activated to generate a unique algorithm request for that data type search and a value data set that can be merchandised commercially.

FIG. 29 is an exemplary system for ingesting and aggregating social platforms allowing for user to create a streaming media curation. In the Overall POPOLOGY USER Flow Description a User may select to sign-up as First Time User or log-in as return member. First Time Users Sign-Up via a series of Splash Screens that collect their "Interests", Iconic "People", "Brands" and "Social Media" accounts by popping floating bubbles with the relevant icons inside each. FIG. 6 through 10b (NOTE: Current state user must pop the bubbles of social platforms which triggers the selected API/IP addresses then allows that user activate of those social platforms to allow those platforms to be displayed in configure module (FIG. 14A). In one embodiment User may select 3 or more social search platforms and if only 2 are chosen, a warning of limited return search criteria will prompt user to select one or more APIs or user can't move forward. In another embodiment, User may select 3 or more search engine or social platforms and if the system detects a limited return search criteria a warning of limited search criteria will be displayed allowing User to revise his search platform selection. In yet another embodiment, a tutorial will suggest User to select at least two competing search engines and three social media platforms to form the complete social platform. One embodiment may allow non-subscription users to integrate up to 5 social platforms whereas paid subscription Users may aggregate up to 25 social platforms. FIG. 11 illustrates a User Intake form providing for email, user password, phone number, and chosen Username, User may also select and upload Profile Pic FIG. 12. In an embodiment, a 5 second animation presents User with a tutorial on a Main Dashboard (FIG. 13). Users are required to configure each API integrated to the POPsphere workspace. The User dictates the API tile count within a 2400 total tile count that each API will populate. These API configurations will be denoted by color coded Social Media Continents as tile clusters. If 10 platforms are integrated, Each API may populate 240 tiles, or User may adjust for more content tiles, and less to other APIs. FIG. 14A Current state user must pop the bubbles of social platforms which triggers the selected API/IP addresses and then allows that user to activate those social platforms to allow those platforms to be displayed in configure module FIG. 14C.

User may now visit dashboards, starting with FIG. 15A POPOLOGIST and include personal profile settings, bio, upload content to NFT gallery (FIG. 15B, 15d-15e) and other customizable features.

User may organize settings of APIs (FIG. 18A) and integrate additional APIs or detach APIs (FIG. 18B).

User access to POPblock dashboard for reviewing smart contracts (19h in FIG. 19B), API Behavior reports (19e, 19f, 19g), turn on/off blockchain (FIG. 19B) feature Detach or Add APIs (19c & 19d). For user to financially benefit and acquire POPtokens and/or POPcoins, the user must turn on the blockchain feature. If the blockchain feature is turned off, the financial benefits are directed to the "house;" the POPOLOGY site owners.

An embodiment may include a User Dashboard for Audience/Friends on platform (FIG. 24A). Users may track Audience size (24a in FIG. 24B), Audience Pay Tally (24c) and standard Invite, Block, and Report user functions (24f).

User may enter the POPsphere workspace to build a POPcast (FIG. 14B) Environment built in Unity Game Engine sourcing MongoDB C # and ASP.net Inside the POPsphere, User presses control+Space bar for search bar activation, types preferred keyword and press enter (FIG. 2A & FIG. 14B). After keyword population of tiles, user may drag and drop any tile (up to 76) into the POPcast timeline. User may double click on the media brought into the POPcast timeline to view content (in full screen view) to confirm media selection. (3a & 3b in FIG. 3). When User is satisfied with POPcast stream media selections, User may press the SAVE button in the onboard CONSOLE (3e). User may then be prompted to NAME POPcast, SAVE to vault (FIG. 4B) or move on to add POPmercial Sponsors (FIG. 4B).

using Microsoft.Extensions.Configuration;
using Microsoft.Extensions.Options;
using MongoDB.Driver;
using POPOLOGY_MDEE_Model;

User may now be able to select POPmercial brand sponsored commercials and insert same into their POPcast from the spots gallery dashboard (FIG. 22A). Each piece of media selected in the POPcast is tabulated by their individual views count from their respective platform, and this value is divided by 20%. This is the "DESIRED POPcast REACH" metric (FIG. 22g) in FIG. 22B. User may select themes from drop down menu of the type of POPmercial they want to include (22b) User can select the DURATION of POPmercial media buy for 4 weeks, 8 weeks, or 12 weeks. (22f) The shorter duration the higher the POPmercial POPtoken payout to the viewing Audience (22e). User may now PUBLISH POPcast when all the Automated POPmercial Count is fulfilled (22j). This capability is driven by the following: "mongoDB.Bson.Serialization.Attributes" calls for the collection of classes of the POPcast® ADbrands which will verify against the Bson type classes under "BsonRepresentation(BsonType.ObjectId".

POPcast AdBrand. User can now earn "PROOF OF WORK" rewards in POPtoken by visiting the "FUTURES IN POPULAR" POPwager dashboard (FIG. 23A). User may select the duration of wager via the drop down calendar module (23f in FIG. 23B) by selecting the start and stop mining dates. User may then input the VALUE of the increase in future views (23g) for the selected content in slider module (23b). User may next press the yellow Smash Button (23j-b) to increase the POPtoken wager value withdrawn from their POPwallet sum (FIG. 23B). When the POPtoken amount is what User wants to wager (23k), User presses confirm. Media Metrics, and Proof of Work is ledgered on the POPblock dashboard as a smart contract (23k in FIG. 23C). User may WAGER only Videos that are in a PUBLISHED POPcast with POPmercial Sponsors attached. "mongoDB.Bson.Serialization.Attributes" calls for the collection of classes of the multi-media sequence which then pulls which will verify against the Bson type classes under "BsonRepresentation(BsonType.Objectld".

MultiMediaSequence

User is recommended to share the finished POPcast link provided by automated process (21g & FIG. 27A) with his friends and family so watchers can earn POPtoken rewards as per the combined POPmercial payout (22e) tallies. The media player may apply WebGL, AEP extension that opens WebGL capabilities. (An AEP file is a video project created by Adobe After Effects, a special effects video editing application. It contains one or more compositions, which are a collection of layers that may include video footage, audio tracks, images, text, and shapes that make up special effects.) Audience may redeem the automated watch code at the end of the POPcast stream (FIG. 27B) which is redeemable only at www.popology.app.

User may visit the POPlounge dashboard to watch other POPcast content (FIG. 26B of his peers for rewards, or watch his NETFLIX, HULU or other VOD content service for data rewards. User may also watch television (26d) from any of their trusted providers through the POPlounge for added data rewards credits. User can also access the POPOLOGY Megaverse 3d Metaverse portal from here as well and tour the landscapes with their 3d Avatar (FIG. 15A).

POPwallet is the digital wallet control for POPtoken and Premium POPOLOGYcoin. (FIG. 20A) Users receive 1000 POPtoken at the beginning of each market day, (20a-1) and is only replenished what they use from the 1000 POPtoken issued on a 24 hour timed clock (20b) One POPOLOGYcoin equals 1000 POPtoken. Additional amounts can be added to each crypto token hold. It relies on Blockchain technology (waves.exchange API) for its rights-managed payouts on Distributed Ledger Technology (DLT).

Users have access to HELP SCREEN instructions (FIG. 25A) via navigation in all dashboards, on all screens (FIG. 14k, 15j, 16j, 18c, 19j, 20e, 21h, 22l, 23m, 24h, 26g).

Inner Workings Formula of FIG. 30; Overall description is found in paragraphs [0157-0167, supra.], which is incorporated herein by this reference. The POPOLOGY Networks platform is a Unity Game engine project formatted in WebGL which (28a, 28b, & FIG. 30) delivers an immersive and 3D user interface/workspace providing functions of content population in web-linked digital rights assets from a pluralization of aggregated sources, up to 25 APIs and as little as 3 APIs are required to join the POPOLOGY Networks platform (30k).

This content ingestion process is masked inside of a framework of fetch components designed in ASP.net on AWS servers, that additionally generate URL calls to these aggregated sources and related servers via keyword searches, enabled by IIS Manager (30g).

This system architecture then parses the ingested content into visible media thumbnails to be imported (or populated) onto the POPsphere tiles, and if content is selected by user, the related meta-data is parsed to the appropriate dashboards after being assembled by MONGOdb (30j) and filtered from our meta-Data repository.

When the content is selected to the POPcast timeline from the POPsphere wall, the content is required to render onto our server (28c & 30g) additionally ledgering its platform origin, content title, duration of time of the content, license owner and other relevant data to the meta-data repository (30i).

Each and every behavior is also recorded and tracked onto the blockchain (28d & 30h) for rewards and smart contract assignments visible in the POPblock dashboard.

Software Menu & Described Use Purpose. WebGL is a JavaScript API for rendering interactive 2D and 3D graphics within any compatible web browser without the use of plug-ins. WebGL is fully integrated with other web standards, allowing GPU-accelerated usage of physics and image processing and effects as part of the web page canvas. ASP.NET Core is the open-source and cross-platform version of ASP.NET, a popular web development framework for building web apps on the NET platform. C++ is one of the world's most popular programming languages. C++ can be found in today's operating systems, Graphical User Interfaces, and embedded systems. C++ is a general-purpose programming language. IIS Manager/web administrators to modify website options, such as default pages, error pages, logging settings, security settings, and performance optimizations. IIS can serve both standard HTML webpages and dynamic webpages, such as ASP.NET applications and PUP pages.

Descriptor for POPmercial Advertising, The POPOLOGY Networks novel approach to advertisers and our users simultaneously is the gamified and intentional approach to "AD RETENTION". Most all other social or search engine platforms traditionally clutter pages or insert commercial media in skippable segments or banners for the user to potentially interact. The reality here is brand retention is minimal and has a reputation of being invasive and annoying. POPOLOGY has taken this into consideration and applied a unique gaming premise that reinvents a role in which the user selects the brands they desire to identify supporting in their already curated POPcast media stream. First the user watches numerous spots from selected brands (in our POPmercial Gallery) and fulfill placement of the required number of POPmercial Adverts for the desired POPcast audience reach. The number of spots to select is automated and calculated by the length of the users total curated POPcast stream. Each spot is placed in 15 min intervals. If a POPcast is less than 15 min then a POPmercial spot is calculated to be placed between each tile in the POPcast posted. Minimum 3 tiles make up a POPcast.

These adverts where placed into the POPmercial Gallery by the brand client for user placement at an average rate of $5 per 1,000 eyes. These spots are meta-tagged by our team incorporating various relevant themes, celebrity spokesperson and search criteria by keywords. They also each carry a POPtoken crypto payout reward for each viewing audience member of the total published POPcast which users are presented with. This POPcast is published as a sharable and promoted link in its own media player, with a non-scrubbable and removed fast forward controls, only pause or rewind, due to a custom watch code at the end of each POPcast for viewing audience members to redeem. This placement premise by the user initiates a care for the brands selected, and the viewers are aware of this "RELEVANT TO THE CREATOR" brand loyalty/brand endorsements that additionally reward the viewing audience to watch.

Monetization & Tokenomics Formula: Brand or Corp Direct client submit the spots intended to be accepted as a POPmercial collection, they also select the audience size and the window of time suggested for advertisement to run, (4 weeks, 8 weeks or 12 weeks.

On average $5 per 1,000 eyes in a 10 day cycle.
 $5 per 1,000 is the formula we will start with . . . also consider 1,000 POPtoken=one $5 POPOLOGYcoin Spot #1 Tokenomic Sample
 $8,102.90 equals a reach of 1,620,580
 We put $4,051.45 in the bank as our earnings.
 $4,051.45 is left minus (18%) $729.26 for 2 Royalty Micro-Payments and Operation fees (1% of the 18% assigned as AICP Micro-payment & 10% of 18% #=Placement Royalty to Producer of record)=$80.21 Placement Royalty Paid
 (Leaving $649.00 in operations including Gamified bonus in POPtoken to Audience.
 Now $3,322.19 to pay audience in POPtoken.
 664.438 is the volume in POPtokens dispersed to 1,620, 580 viewing audience members is paid 2.439 POPtoken each.

Spot #2 1 Tokenomic Sample
 $5,000 equals reach of 1 million people
 $2500 in the bank for us.
 $2500 minus 18% for 2 Royalty Micro-Payments and Operation fees
 equals $2,050 left to pay 1 million people
 410,000 POPtoken volume divided by one million people equals 2.439 POPtoken each paid out to each audience member.

Spot #3 1 Tokenomic Sample
 $6,500 equals a reach of 1,300,000
 $3,250.00 in the bank
 $3,250.00 left
 minus 18% is $585 for 2 Royalty Micro-Payments and Operation fees
 Now $2,665.00 to pay audience in POPtoken.
 533,000 is the volume in POPtoken dispersed to 1,300, 000 viewing audience members is 2.439 POPtoken each.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

We claim:

1. A system including media elements for constructing an initial search algorithm having search indicia as a personalized and user assembled meta-search engine to generate video content trusted streaming media search results displayed as tiles within a metaverse that allow a user to curate a broadcast of selected media tiles and media sponsored advertisements stored in a database memory having instructions stored therein, that upon users selection form a data base component of sponsored video advertisements that can be published and legered into a blockchain that includes views and user behaviors for cryptographic token rewards, and fosters tracking of user data and behaviors comprising:

one or more processors programed to perform operations associated with the system;
 one or more data bases having a memory configured for storing a plurality of media elements, stored instructions and resultant information from operations associated with the system;
 at least one central processing unit server having a memory interface to access the database and instructions stored in the memory and including one or more processors each configured for executing the stored instructions for performing at least one operation in the system on the media elements and to service the system including:
 Application Programming Interface (API) components, that include Application Programming Interfaces (APIs) selected by a user from the group consisting of search engines, social media memberships, business utilities and their combinations;
 a user-assembled meta-search engine component including multiple of the Application Programming Interface (API) components to operate collectively as the initial search algorithm, further configured to retrieve aggregated streaming media search results;
 a Representational State Transfer Application Programing Interface (Restful API) component that seamlessly integrates user data and behaviors;
 an immersive user interface (UI) component that displays each tile from the streaming media search results for each Application Programming Interface (API) component;
 a user curated broadcast media streaming component configured from tiles the user selects in the user interface (UI) component;
 a data base component containing sponsored video advertisements that are stored in the data base memory, wherein the media stream of sponsored video advertisements may be selected and embedded within the broadcast by the user;
 a blockchain component, wherein said broadcast may be subsequently published and ledgered on the blockchain as a blockchain-based non-fungible token (NFT); and
 a Representational State Transfer Application Programing Interface (Restful API) component having user data and behaviors ledgered on the blockchain for cryptographic token rewards as data reports and subscriptions.

2. The system of claim 1, wherein the Application Programming Interface (API) components have been previously used by a user, thereby furthering the trusted streaming media search results as a result of searches being further informed by user's past interests and behaviors.

3. The system of claim 1, wherein at least some of the search engines Application Programming Interfaces (APIs) are selected from the group consisting of Google, Yahoo, Yandex, Bing, DuckDuckGo, Ask, Gigablast, Shopzilla and combinations thereof.

4. The system of claim 1, wherein search indicia included in the initial search algorithm is further selected from the group consisting of user's interests, people, brands, social media memberships, social media subscriptions and combinations thereof.

5. The system of claim 1, wherein at least some of the social media Application Programming Interfaces (APIs) are selected from the group consisting of Facebook, Twitter, YouTube, Instagram, Daily Motion, Tik Tok, Google, Bing, Reddit, Yandex, Vimeo, and combinations thereof.

6. The system of claim 1, wherein the broadcast contains various story points and users can compare and contrast opposing story points of any streaming media tile based on the Application Programing Interface (API) component it comes from.

7. The system of claim 1, wherein the tiles are displayed inside of a spherical metaverse.

8. The system of claim 1, wherein said processing component is selected from the group consisting of mobile devices, computers, virtual reality devices, game consoles, laptops and combinations thereof.

9. The system of claim 1, further configured for making a token wager on the broadcast wherein proof of work is calculated by forecasting the number of views any respective video in the ledgered broadcast will receive in a given time period, by staking a wager.

10. The system of claim 1, wherein sponsored media advertisements consist of separate media advertising tiles and the views and behaviors of the media advertising tiles are tracked as data for sponsoring advertisers.

11. A system for constructing a personalized and user-assembled initial search algorithm as a meta search engine to generate aggregated streaming media search results displayed as video tiles that allow a user to curate a broadcast of selected video tiles that can be published and legered onto a blockchain to foster tracking of user data and behaviors and issuance of cryptographic token rewards comprising:
  at least one processor programed to perform operations associated with the system;
  one or more data bases having a memory configured for storing a plurality of media elements, stored instructions and resultant information from operations associated with the system;
  at least one central processing unit server having a memory interface to access the database and instructions stored in the memory and including one or more processors each configured for executing the stored instructions for performing at least one operation in the system on media elements and to service the system including;
  Application Programing Interface (API) components, that include Application Programing Interfaces (APIs) selected from the group consisting of search engines, social media memberships, business utilities and their combinations;
  a meta-search engine component that combines multiple Application Programing Interface (API) components to operate collectively as the initial search algorithm configured to retrieve aggregated streaming media search results from at least three separate Application Programing Interface (API) components,
  wherein a single Representational State Transfer Application Programing Interface (RESTful API) component is generated by seamlessly integrated user data and behaviors;
  a user curated media streaming broadcast component;
  a user created media stream sponsored advertisements component having a video tile or tiles selected and embedded by a user within the curated media streaming broadcast component;
  a blockchain component, wherein the video tile or tiles in the media streaming broadcast component may be published as a blockchain-based non-fungible token (NFT);
  said system further configured for making a wager on the published and ledgered media streaming broadcast component wherein proof of work (PoW) is calculated by forecasting the number of views a selected tile or tiles in the media streaming broadcast component will receive in a given time period and staking a wager on the forecast and mining cryptographic token rewards for being correct.

12. A method for constructing a personalized and user-assembled initial algorithm as a meta-search engine that displays aggregated streaming media search results in the form of video tiles which are curated into a broadcast and includes user selected media streaming sponsored video advertisements that are legered on a blockchain and published as a blockchain-based non-fungible token having individual blocks and may include stake and wagering of anticipated views of the tiles over a period of time and mining of cryptographic token rewards to solve an associated cryptographic puzzle for each block in a blockchain, comprising:
  selecting at least three Application Programing Interface (API) components that include Application Programing Interfaces (APIs) from separate search engines, social media memberships, business utilities and their combinations, wherein said Application Programing Interface (API) components operate collectively as an initial algorithm;
  retrieving streaming media search results in the form of video tiles using said initial algorithm;
  generating a single Representational State Transfer Application Programing Interface (RESTful API) by seamlessly integrating user data and behaviors from said Application Programing Interface (API) components;
  curating content from the aggregated streaming media search results into a broadcast;
  embedding media streaming sponsored video advertisements selected and placed by the user within the broadcast; and
  publishing said broadcast as a blockchain-based non-fungible token (NFT).

13. The method of claim 12, for implementing proof of work, wherein the broadcast includes tiles, further including
  making a wager on the broadcast;
  forecasting the number of views a selected tile or tiles in the broadcast will receive in a given time period;
  staking a wager on the forecast; and
  mining cryptographic token rewards for being correct.

14. The method of claim 13, implementing Proof of Work (PoW) on a single block of the blockchain until an associated cryptographic puzzle is resolved.

15. The method of claim 12, further including comparing the aggregated streaming media search results to obtain lateral content-discovery of diverse viewpoints.

16. The method of claim 12, further including integrating educational matrices and meta-data to allow users to understand prevalent content preferences and behaviors that provide users with real-time insights into popular media consumption patterns and trends.

17. The method of claim 12 for use in digital rights management (DRM) and content policing, wherein the streaming media search results include at least two similar search result assets in the form of tiles, one of said streaming media search results derived from an owner or stakeholder, and the other, a conflicting asset of an original asset, wherein the asset is cached in a temporary storage location, further including:
  assigning a unique asset ID number to each tile of curated broadcast;
  caching each asset in said curated broadcast;
  comparing cached assets to identify content matches;
  determining which of the cached assets result from an original source; and
  notifying the owner or stakeholder of the conflicting asset.

18. The method of claim 12, for establishing information and media literacy precepts within an immersive, scrollable, gamified internet broadcast network that facilitates integrated meta-data delivery and cross content exploration, including:
- displaying searched contents from said Application Programing Interface (API) components within a scrollable arrangement that facilitates cross-source content exploration;
- offering, via integrated meta-data delivery, real-time insights into popular media consumption patterns across a user interface (UI) and user media literacy comprehension of prevalent content preferences and behaviors;
- assembling by a user content from multiple media search results in a personalized curated broadcast of media streams that allows users to create multimedia narratives encompassing various perspectives through active content curation and storytelling;
- identifying bias and misinformation in video tiles by analyzing the video tiles within the user interface (UI); and
- educating users about Proof of Work (PoW) and popular at large by allowing users to predict future views within a duration of time of video tiles in the ledgered video tiles by staking wagers on prediction accuracy and earning rewards for accurate predictions.

19. A method of claim 18, including sponsored video advertisements, further including inserting media streaming sponsored video advertisements that feature educational values incorporating informative and socially responsible content, whereby users are encouraged to critically evaluate the advertisements for enhanced media literacy.

20. A non-transitory computer readable medium containing program instructions when executed by a computer to perform a method of constructing a personalized and user-assembled meta-search engine that includes user data and behaviors and displays streaming media search results in the form of video tiles which are curated into a broadcast and includes user selected media streaming sponsored video advertisements, a published curated broadcast as a blockchain-based non-fungible token and may include stake and wagering of anticipated views of the tiles for a given time period for cryptographic token rewards and to solve an associated cryptographic puzzle for each block in a blockchain, comprising:
- selecting by a user multiple Application Programming Interface (API) components that include a plurality of separate Application Programing Interfaces (APIs) selected from search engines, social media memberships, business utilities and their combinations, wherein said Application Programing Interface (API) components operate collectively as an initial algorithm;
- retrieving streaming media search results in the form of video tiles using said initial algorithm;
- generating a single Representational State Transfer Application Programing Interface (RESTful API) by seamlessly integrating user data and behaviors search results from said API components into a bundled algorithm;
- curating by a user, content from the streaming media search results into a broadcast;
- embedding media streaming sponsored video advertisements selected and placed by the user within the broadcast; and
- publishing said broadcast as a blockchain-based non-fungible token (NFT).

21. The non-transitory computer readable medium of claim 20, implementing proof of work, further including
- making a wager on the broadcast;
- forecasting the number of views a selected tile or tiles in the broadcast will receive in a given time period, and
- staking a wager on the forecast and mining cryptographic token rewards for being correct.

22. The non-transitory computer readable medium of claim 21, by implementing Proof of Work (PoW) on a single block of the blockchain until the associated cryptographic puzzle is resolved.

23. The non-transitory computer readable medium of claim 20, further including comparing the streaming media search results to obtain lateral content discovery of diverse viewpoints.

24. The non-transitory computer readable medium of claim 20 for use in digital rights management (DRM) and content policing, wherein the streaming media search results include at least two similar search result assets in the form of tiles, one of said streaming media search results derived from an owner or stakeholder, and the other, a conflicting asset of the original asset, wherein the asset is cached in a temporary storage location, further including:
- assigning a unique asset ID number to each tile of curated broadcast;
- caching each asset in said curated broadcast;
- comparing cached assets to identify content matches;
- determining which of the cached assets result from an original source; and
- notifying the owner or stakeholder of the conflicting asset.

25. The non-transitory computer readable medium of claim 20, wherein the tiles are arranged immersively within a sphere and the immersive arrangement of the tiles includes displaying each tile inside of a sphere.

26. The non-transitory computer readable medium of claim 20, wherein the tiles are arranged immersively within a sphere and the immersive arrangement of the tiles includes displaying each tile resulting from each Application Programing Interface (API) as a grouping of tiles from the same Application Programing Interface (API).

27. The non-transitory computer readable medium of claim 20, further including:
- ledgering the user data and behaviors on the blockchain for cryptographic token rewards.

28. The non-transitory computer readable medium of claim 20, further including:
- tracking the number of views of a sponsored video advertisement; and reporting and providing payouts to sponsoring advertisers.

29. The non-transitory computer readable medium of claim 20, including tracking the views and behaviors of the ledgered streaming media advertising tiles for reporting to sponsoring advertisers.

* * * * *